(12) United States Patent
Lee et al.

(10) Patent No.: US 11,216,544 B2
(45) Date of Patent: Jan. 4, 2022

(54) METHOD AND ELECTRONIC DEVICE FOR OBTAINING BIOMETRIC INFORMATION IN SECTION IN WHICH IMAGE DATA IS NOT TRANSMITTED TO DISPLAY

(71) Applicant: Samsung Electronics Co., Ltd., Gyeonggi-do (KR)

(72) Inventors: Minwoo Lee, Gyeonggi-do (KR); Daekwang Jung, Gyeonggi-do (KR); Myungsu Kang, Seoul (KR); Jiwoong Oh, Seoul (KR); Hyunju Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 16/499,893

(22) PCT Filed: Feb. 8, 2018

(86) PCT No.: PCT/KR2018/001717
§ 371 (c)(1),
(2) Date: Oct. 1, 2019

(87) PCT Pub. No.: WO2018/186580
PCT Pub. Date: Oct. 11, 2018

(65) Prior Publication Data
US 2020/0117782 A1 Apr. 16, 2020

(30) Foreign Application Priority Data
Apr. 6, 2017 (KR) .......................... 10-2017-0044977

(51) Int. Cl.
*G06F 21/32* (2013.01)
*G09G 3/34* (2006.01)

(52) U.S. Cl.
CPC .......... *G06F 21/32* (2013.01); *G09G 3/3406* (2013.01); *G09G 2310/063* (2013.01); *G09G 2320/0626* (2013.01)

(58) Field of Classification Search
CPC ................. G06F 21/32; G09G 3/3406; G09G 2310/063; G09G 2320/0626
See application file for complete search history.

(56) References Cited

U.S. PATENT DOCUMENTS 8,564,314 B2 * 10/2013 Shaikh ................ G06K 9/0002
324/686
9,142,188 B2 * 9/2015 Kurikko ................ G09G 5/001
(Continued)

FOREIGN PATENT DOCUMENTS

KR 10-2016-0013509 A 2/2016
KR 10-2016-0080767 A 7/2016
(Continued)

OTHER PUBLICATIONS

Kim, Translation of KR 20170030735, Mar. 20, 2017 (Year: 2017).*

*Primary Examiner* — Dmitriy Bolotin
(74) *Attorney, Agent, or Firm* — Cha & Reiter, LLC

(57) ABSTRACT

The present invention relates to a method by which an electronic device including a biosensor obtains biometric information in a section in which image data is not transmitted to a display. An electronic device according to various embodiments of the present invention comprises: a display; a biosensor formed in at least a portion of the display; and a processor functionally connected with the display, and the biosensor, wherein the processor can extend a blank section of a reference signal, which is any one of a plurality of signals for driving the display in a state of sensing the biometric information of a user, and can drive (Continued)

the biosensor in the extended blank section of the reference signal so as to sense the biometric information of the user. The present invention can also include additional various embodiments.

13 Claims, 23 Drawing Sheets

(56) References Cited

U.S. PATENT DOCUMENTS

| | | | |
|---|---|---|---|
| 9,773,148 B2* | 9/2017 | Mo | G06F 3/0443 |
| 10,627,938 B2* | 4/2020 | Lee | G06F 3/04164 |
| 2012/0249507 A1* | 10/2012 | Chung | G09G 3/3614 |
| | | | 345/211 |
| 2013/0307818 A1* | 11/2013 | Pope | G06K 9/00053 |
| | | | 345/174 |
| 2015/0254491 A1* | 9/2015 | Mo | G06K 9/0002 |
| | | | 345/174 |
| 2017/0083738 A1* | 3/2017 | Park | G09G 3/3648 |
| 2017/0336909 A1* | 11/2017 | Song | G06K 9/00013 |
| 2017/0344787 A1* | 11/2017 | Cho | G06F 3/04886 |
| 2018/0088715 A1* | 3/2018 | Lee | G02F 1/1343 |
| 2018/0113346 A1* | 4/2018 | Han | G06F 3/0446 |
| 2018/0113548 A1* | 4/2018 | Lee | G06F 3/0412 |
| 2018/0113558 A1* | 4/2018 | Cho | G06F 3/0445 |
| 2018/0173923 A1* | 6/2018 | Lee | G06K 9/0004 |
| 2018/0196931 A1* | 7/2018 | Cho | G06F 3/0412 |
| 2018/0349667 A1* | 12/2018 | Kim | G06K 9/0002 |
| 2018/0349669 A1* | 12/2018 | Kim | G06K 9/22 |
| 2019/0189048 A1* | 6/2019 | Hong | G09G 3/2096 |

FOREIGN PATENT DOCUMENTS

| | | |
|---|---|---|
| KR | 10-2017-0000654 A | 1/2017 |
| KR | 10-2017-0030735 A | 3/2017 |

* cited by examiner

METHOD AND ELECTRONIC DEVICE FOR OBTAINING BIOMETRIC INFORMATION IN SECTION IN WHICH IMAGE DATA IS NOT TRANSMITTED TO DISPLAY

CROSS REFERENCE TO RELATED APPLICATIONS

This application is a National Phase Entry of PCT International Application No. PCT/KR2018/001717, which was filed on Feb. 8, 2018, and claims a priority to Korean Patent Application No. 10-2017-0044977, which was filed on Apr. 6, 2017, the contents of which are incorporated herein by reference.

TECHNICAL FIELD

The disclosure relates to a method for acquiring biometric information during a period when video data is not transmitted to a display in an electronic device including a biometric sensor.

BACKGROUND ART

Recently, an electronic device is additionally provided with a function of recognizing user's biometric information for user authentication or the like. For example, an electronic device may include a fingerprint recognition module, a proximity sensor module, an illumination sensor module, or an iris sensing module as a biometric sensor.

DISCLOSURE OF INVENTION

Technical Problem

According to an electronic device in the related art, a biometric sensor is mainly disposed in a non-display area in which a screen of a display is not located. For example, the biometric sensor may be disposed in an area located on an upper side of the screen or an area located on a lower side of the screen on a front surface on which the screen of the display is disposed.

Meanwhile, there have been increasing demands of users who desire a larger area of the screen in a state where the overall size of the electronic device is equally maintained.

In order to fulfill the above-described user demands, a scheme for disposing a biometric sensor inside the area where the screen of the display is disposed has been considered. However, according to the electronic device according to the scheme as described above, mutual interference may occur between signals for driving the display and a signal from the biometric sensor, and it may be difficult to secure sufficient time for processing data of the biometric sensor to cause a problem.

Various embodiments of the disclosure can provide an electronic device and a method capable of heightening a recognition accuracy of the biometric sensor by reducing the mutual interference between the display and the biometric sensor and securing the sufficient time for processing the data of the biometric sensor.

Solution to Problem

According to various embodiments of the disclosure, an electronic device may include a display; a biometric sensor formed on at least a part of the display; and a processor functionally connected to the display and the biometric sensor, wherein the processor is configured to extend a blank period of a reference signal that is any one of a plurality of signals for driving the display in a state where user's biometric information is sensed, and sense the user's biometric information through driving of the biometric sensor in the extended blank period of the reference signal.

According to various embodiments of the disclosure, a method for operating an electronic device to reduce interference between a biometric sensor and a display may include extending a blank period of a reference signal that is any one of a plurality of signals for driving the display in a state where the electronic device senses user's biometric information; and sensing the user's biometric information through driving of the biometric sensor in the extended blank period of the reference signal.

Advantageous Effects of Invention

According to the various embodiments of the disclosure, the recognition accuracy of the biometric sensor can be heightened through reduction of the mutual interference between the display and the biometric sensor and securing of the sufficient time for processing the data of the biometric sensor.

ADVANTAGEOUS EFFECTS OF INVENTION

MODE FOR THE INVENTION

Figure 1:
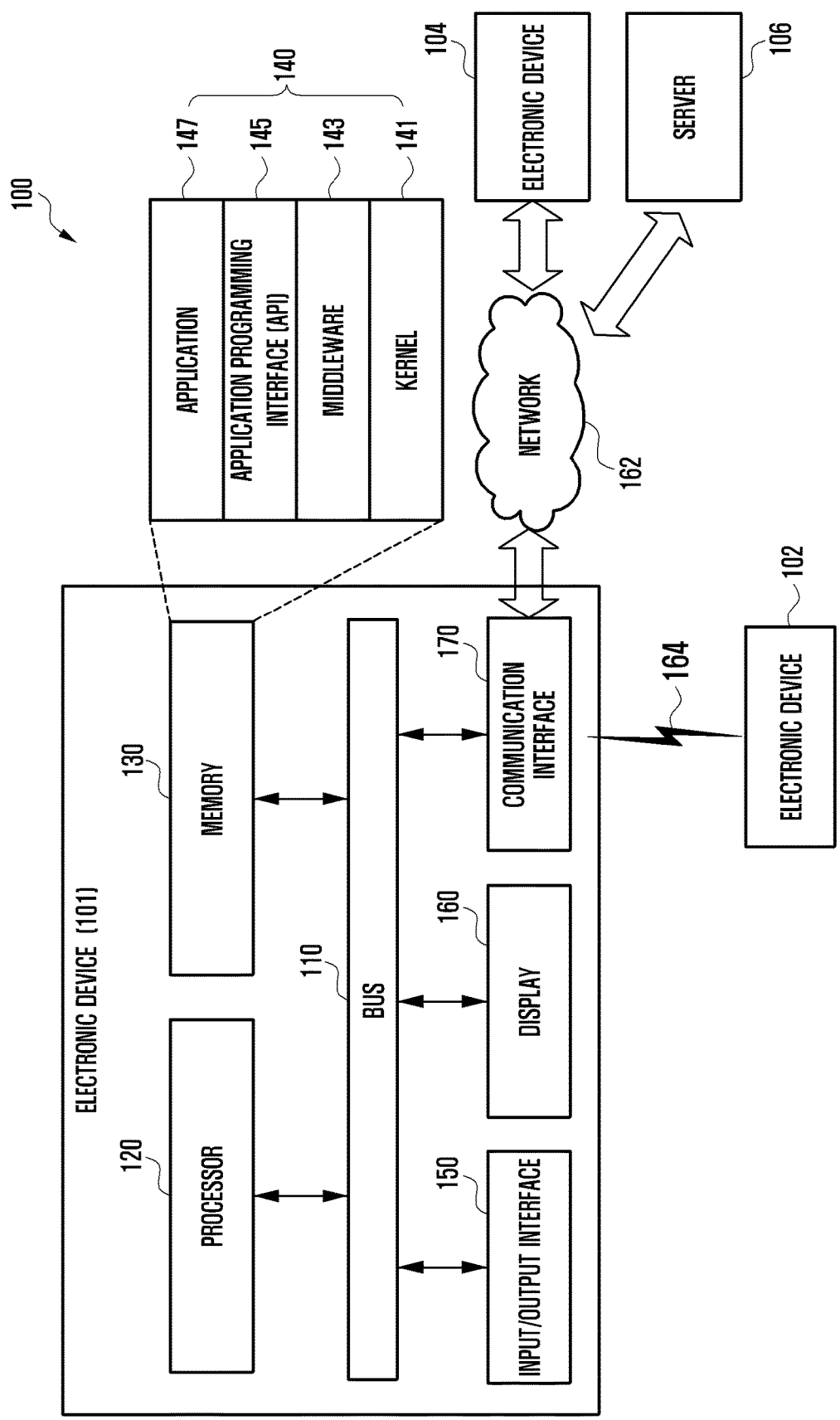
FIG. 1 is a block diagram illustrating an electronic device within a network environment according various embodiments.

Hereinafter, various embodiments will be described with reference to the accompanying drawings. The embodiments and the terms used therein are not intended to limit the technology disclosed herein to specific forms, and should be understood to include various modifications, equivalents, and/or alternatives of the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various elements regardless of the order and/or the importance, and is used merely to distinguish one element from another element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments may be interchangeably used with, for example, "suitable for", "having the capacity to", "adapted to", "made to", "capable of", or "designed to" in terms of hardware or software, according to circumstances. Alternatively, in some situations, the expression "device configured to" may mean that the device, together with other devices or components, "is able to". For example, the phrase "processor adapted (or configured) to perform A, B, or C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, or a wearable device. The wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or tattoo), or a bio-implantable type (e.g., an implantable circuit). In some embodiments, the electronic device may include at least one of, for example, a television, a digital video disk (DVD) player, an audio, a refrigerator, an air conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, or an electronic photo frame.

In other embodiments, the electronic device may include at least one of various medical devices (e.g., various portable medical measuring devices (a blood sugar measuring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting tool, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. According to an embodiment, the electronic devices are not limited to those described above. In the disclosure, the term "user" may indicate a person using an electronic device or a device (e.g., an artificial intelligence electronic device) using an electronic device.

Referring to FIG. 1, an electronic device 101 within a network environment 100 according to various embodiments will be described. The electronic device 101 may include a bus 110, a processor 120, a memory 130, an input/output interface 150, a display 160, and a communication interface 170. In some embodiments, the electronic device 101 may omit at least one of the elements, or may further include another element. The bus 110 may include, for example, a circuit that interconnects the elements 110 to 170 and enables communication (for example, transmission of control messages or data) between the elements. The processor 120 may include one or more of a central processing unit, an application processor, and a communication processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relating to at least one other element of the electronic device 101. According to an embodiment, the memory 130 may store software and/or a program 140. The program 140 may include a kernel 141, middleware 143, an application programming interface (API) 145, and/or application programs (or "applications") 147. At least some of the kernel 141, the middleware 143, and the API 145 may be referred to as an operating system. The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 can access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (for example, the bus 110, the processor 120, the memory 130, or the like) of the electronic device 101 to one or more of the application programs 147, and may process the one or more task requests. The API 145 is an interface through which the applications 147 control functions provided from the kernel 141 or the middleware 143, and may include, for example, at least one interface or function (for example, instruction) for file control, window control, image processing, or text control. For example, the input/output interface 150 may forward instructions or data, input from a user or an external device, to the other element(s) of the electronic device 101, or may output instructions or data, received from the other element(s) of the electronic device 101, to the user or an external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may display, for example, various types of contents (e.g., text, images, videos, icons, or symbols) to the user. The display 160 may include a touch screen and may receive, for example, a touch, gesture, proximity, or hovering input using an electronic pen or the user's body part. The communication interface 170 may establish, for example, communication between the electronic device 101 and an external device (for example, a first external electronic device 102, a second external electronic device 104, or a server 106). For example, the communication interface 170 may be connected to a network 162 through wireless or wired communication to communicate with an external device (for example, the second external electronic device 104 or the server 106).

The wireless communication may include, for example, a cellular communication that uses at least one of LTE, LTE-Advanced (LTE-A), code division multiple access (CDMA), wideband CDMA (WCDMA), universal mobile telecommunications system (UMTS), wireless broadband (WiBro), global system for mobile communications (GSM), or the like. According to one embodiment, the wireless communication may include a short-range communication 164. For example, as indicated by reference numeral 164 in FIG. 1, the short-range communication 164 may include at least one of wireless fidelity (WiFi), light fidelity (LiFi), Bluetooth, bluetooth low energy (BLE), Zigbee, near field communication (NFC), magnetic secure transmission, radio frequency (RF), or body area network (BAN). According to an embodiment, the wireless communication may include, for example, at least one of wireless fidelity (WiFi), light fidelity (LiFi), Bluetooth, bluetooth low energy (BLE), Zigbee, near field communication (NFC), magnetic secure transmission, radio frequency (RF), or body area network (BAN). According to an embodiment, the wireless communication may include a global navigation satellite system (GNSS). The GNSS may be, for example, a global positioning system (GPS), a global navigation satellite system (GNSS), a Beidou navigation satellite system (hereinafter, referred to as "Beidou"), or Galileo (the European global satellite-based navigation system). Hereinafter, in this disclosure, the term "GPS" may be interchangeable with the term "GNSS". The wired communication may include, for example, at least one of a universal serial bus (USB), a high definition multimedia interface (HDMI), recommended standard 232 (RS-232), power line communication, or a plain old telephone service (POTS). The network 162 may include a telecommunications network, for example, at least one of a computer network (for example, a LAN or a WAN), the Internet, and a telephone network.

Each of the first and second external electronic devices 102 and 104 may be of the same as or a different type from the electronic device 101. According to various embodiments, all or some of the operations executed in the electronic device 101 may be executed in another electronic device or a plurality of other electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result thereof to the electronic device 101. The electronic device 101 may provide the received result as it is, or may additionally process the received result to provide the requested functions or services. To this end, for example, cloud computing, distributed computing, or client-server computing technology may be used.

Figure 2:
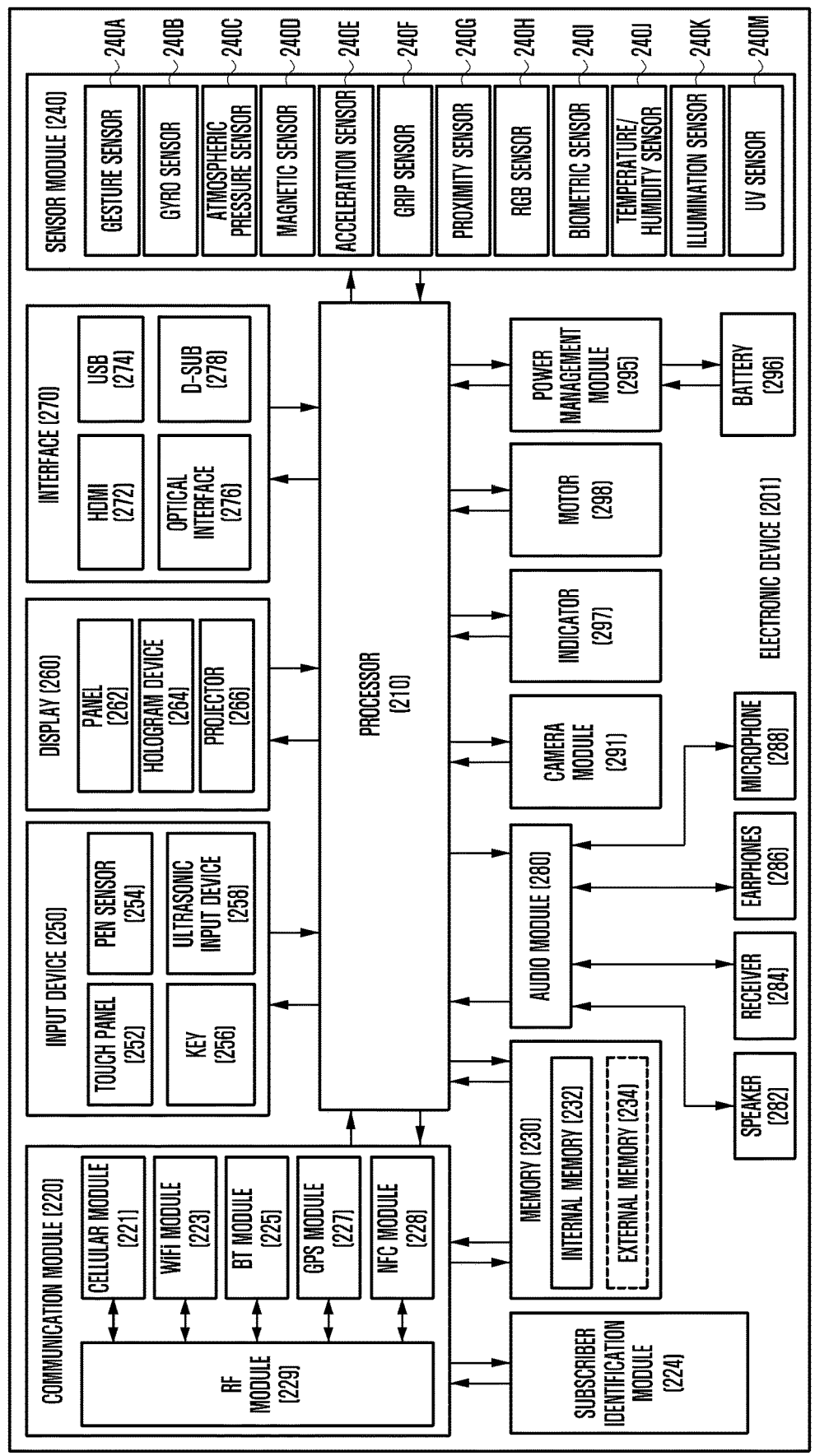
FIG. 2 is a block diagram of an electronic device according to various embodiments.

FIG. 2 is a block diagram of an electronic device 201 according to various embodiments. The electronic device 201 may include, for example, the whole or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected to the processor 210 and perform various data processing and operations by driving an operating system or an application program. The processor 210 may be implemented by, for example, a system on chip (SoC). According to an embodiment, the processor 210 may further include a graphic processing unit (GPU) and/or an image signal processor. The processor 210 may also include at least some of the elements illustrated in FIG. 2 (for example, a cellular module 221). The processor 210 may load, in volatile memory, instructions or data received from at least one of the other elements (for example, non-volatile memory), process the loaded instructions or data, and store the resultant data in the non-volatile memory.

The communication module 220 may have a configuration that is the same as, or similar to, that of the communication interface 170. The communication module 220 may include, for example, a cellular module 221, a Wi-Fi module 223, a Bluetooth module 225, a GNSS module 227, an NFC module 228, and an RF module 229. The cellular module 221 may provide, for example, a voice communication service, a video communication service, a text message service, an Internet service, or the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 can provide. According to an embodiment, the cellular module 221 may include a communication processor (CP). In some embodiments, at least some (two or more) of the cellular module 221, the Wi-Fi module 223, the Bluetooth module 225, the GNSS module 227, or the NFC module 228 may be included in a single integrated chip (IC) or IC package. The RF module 229 may transmit or receive, for example, a communication signal (for example, an RF signal). The RF module 229 may include, for example, a transceiver, a power amplifier module (PAM), a frequency filter, a low noise amplifier (LNA), an antenna, or the like. According to another embodiment, at least one of the cellular module 221, the Wi-Fi module 223, the Bluetooth module 225, the GNSS module 227, and the NFC module 228 may transmit/receive an RF signal through a separate RF module. The subscriber identification module 224 may include, for example, a card that includes a subscriber identity module and/or an embedded SIM, and may contain unique identification information (for example, an integrated circuit card identifier (ICCID)) or subscriber information (for example, an international mobile subscriber identity (IMSI)).

The memory 230 (for example, the memory 130) may include, for example, an internal memory 232 or an external memory 234. The internal memory 232 may include, for example, at least one of a volatile memory (for example, a DRAM, an SRAM, an SDRAM, or the like) and a non-volatile memory (for example, a one-time programmable ROM (OTPROM), a PROM, an EPROM, an EEPROM, a mask ROM, a flash ROM, a flash memory, a hard disc drive, or a solid state drive (SSD)). The external memory 234 may include a flash drive, for example, a compact flash (CF), a secure digital (SD), a micro-SD, a mini-SD, an eXtreme digital (xD), a multi-media card (MMC), or a memory stick. The external memory 234 may be functionally and/or physically connected to the electronic device 201 through various interfaces.

The sensor module 240 may, for example, measure a physical quantity or detect the operating state of the electronic device 201 and convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, or a ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may employ, for example, at least one of a capacitive scheme, a resistive scheme, an infrared scheme, and an ultrasonic scheme. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or a POS sensor) which may measure a strength of pressure of a user's touch. The pressure sensor may be implemented integrally with the touch panel 252 or as one or more sensors separate from the touch panel 252. The hologram device 264 may show a three-dimensional image in the air by using an interference of light. The projector 266 may display an image by projecting light onto a screen. The screen may be located, for example, at the inside of outside of the electronic device 201. The interface 270 may include, for example, an HDMI 272, a USB 274, an optical interface 276, or a D-subminiature (D-sub) 278. The interface 270 may be included in, for example, the communication interface 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280 may convert, for example, sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, an earphone 286, the microphone 288, and the like. The camera module 291 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp). The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, or the like. The electronic device 201 may include a mobile TV support device that can process media data according to a standard, such as digital multimedia broadcasting (DMB), digital video broadcasting (DVB), MediaFlo™, and the like. Each of the above-described component elements of hardware according to the disclosure may include one or more elements, and the names of the corresponding elements may change based on the type of electronic device. In various embodiments, an electronic device (for example, the electronic device 201) may omit some elements or may further include additional elements, or some of the elements of the electronic device may be combined with each other to configure one entity, in which case the electronic device may identically perform the functions of the corresponding elements prior to the combination.

Figure 3:
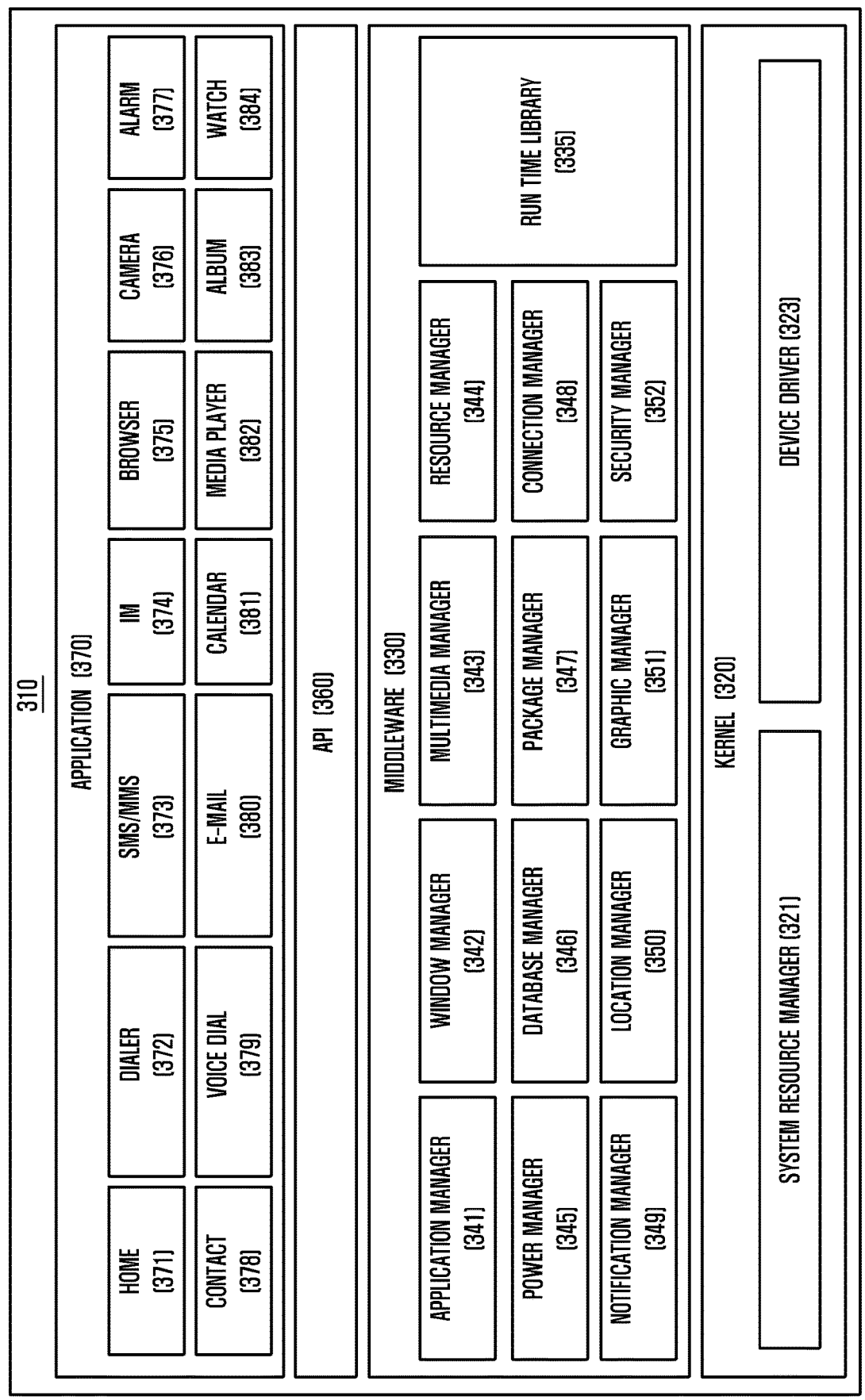
FIG. 3 is a block diagram of a program module according to various embodiments.

FIG. 3 is a block diagram of a program module according to various embodiments. According to an embodiment, the program module 310 (for example, the program 140) may include an operating system (OS) that controls resources relating to an electronic device (for example, the electronic device 101) and/or various applications (for example, the application programs 147) that are driven on the operating system. The operating system may include, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or applications 370 (for example, the application programs 147). At least a part of the program module 310 may be preloaded on the electronic device, or may be downloaded from an external electronic device (for example, the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function required by the applications 370 in common, or may provide various functions to the applications 370 through the API 360 such that the applications 370 can efficiently use limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the application 370 is being executed. The runtime library 335 may perform an input/output, manage a memory, or process an arithmetic function. The application manager 341 may manage, for example, the life cycle of the application 370. The window manager 342 may manage GUI resources used for a screen. The multimedia manager 343 may identify formats required for reproducing various media files and may encode or decode a media file using a codec suitable for the corresponding format. The resource manager 344 may manage the source code of the application 370 or the space in memory. The power manager 345 may manage, for example, battery capacity, temperature, or power, and may determine or provide power information required for the operation of the electronic device based on corresponding information. According to an embodiment, the power manager 345 may operate in conjunction with a basic input/output system (BIOS). The database manager 346 may, for example, generate, search, or change databases to be used by the application 370. The package manager 347 may manage the installation or update of an application that is distributed in the form of a package file.

The connectivity manager 348 may manage, for example, a wireless connection. The notification manager 349 may provide information on an event (for example, an arrival message, an appointment, a proximity notification, or the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide specialized modules according to the types of operation systems. Furthermore, the middleware 330 may dynamically remove some of the existing elements, or may add new elements. The API 360 is, for example, a set of API programming functions, and may be provided while having different configurations depending on the operating system. For example, in the case of Android or iOS, one API set may be provided for each platform, and in the case of Tizen, two or more API sets may be provided for each platform.

The application 370 may include, for example, a home 371, dialer 372, short message service (SMS)/multimedia messaging service (MMS) 373, instant message (IM) 374, browser 375, camera 376, alarm 377, contact 378, voice dial 379, email 380, calendar 381, media player 382, album 383, watch 384, health care (e.g., for measuring the degree of workout or biometric information, such as blood sugar), or environmental information (e.g., for measuring air pressure, humidity, or temperature information) application. According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may perform turn-on or turn-off of the function of an external electronic device communicating with the electronic device (e.g. the external electronic device itself or some elements thereof) or adjust the brightness of (or resolution) of a display thereof, or may install, delete, or update an application running on the external electronic device. According to an embodiment, the application 370 may include applications (for example, a health care application of a mobile medical appliance) that are designated according to the attributes of an external electronic device. According to an embodiment, the application 370 may include applications received from an external electronic device. At least a part of the program module 310 may be implemented (for example, executed) by software, firmware, hardware (for example, the processor 210), or a combination of two or more thereof and may include a module, a program, a routine, an instruction set, or a process for performing one or more functions.

The term "module" as used herein may include a unit including hardware, software, or firmware, and may, for example, be used interchangeably with the term "logic", "logical block", "component", "circuit", or the like. The "module" may be an integrated element, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an optical media (e.g., CD-ROM, DVD), a magneto-optical media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

An electronic device 101 according to various embodiments of the disclosure may include a display 160, a biometric sensor 240I formed on at least a partial area of the display 160, and at least one processor 410 functionally connected to the display 160 and the biometric sensor 240I, wherein the at least one processor 410 may be configured to identify a user input related to a biometric authentication, extend, at least based on the user input, a pre-designated time of a second period between a first period in which video data VD to be provided through the display 160 is transmitted to the display 160 and the second period in which the video data VD is not transmitted to the display 160, and acquire user's biometric information related to the biometric authentication by using the biometric sensor 240I during the extended second period. If minimum biometric information required to authenticate the biometric information (e.g., if the biometric information is a fingerprint, biometric information including the minimum number (e.g., about 5) of feature points required to authenticate the fingerprint) is acquired, the processor 410 may change the second period extended to the second designated time to a first designated time. The processor 410 may calculate a refresh rate at least based on a difference in length between the first period and the second period extended to the second designated time, and if the calculated refresh rate is smaller than a pre-stored threshold value, the processor 410 may output a designated image through the display 160. The designated background image may include a user interface including a flicker or an image having a brightness that is adjusted to be equal to or lower than a specific brightness. The second period may be at least a part of a period in which a horizontal synchronization signal, a vertical synchronization signal, a data enable signal, or at least one clock pulse is not output. The biometric sensor 240I may include a first sensor area and a second sensor area, and the processor 410 may be configured to acquire biometric information corresponding to the first sensor area in the second period extended to the second designated time, and to acquire biometric information corresponding to the second sensor area in the second period extended to the second designated time. The processor 410 may be configured to perform a matching operation of the biometric information corresponding to the first sensor area with pre-stored biometric information in a third period in which the video data VD is displayed after the second period, and to perform a matching operation of the biometric information corresponding to the second sensor area with the pre-stored biometric information in a fourth period in which the video data VD is displayed after the other second period. If the user is authenticated through the matching operation of the biometric information corresponding to the first sensor area, the processor 410 may be configured to refrain from matching the biometric information corresponding to the second sensor area. The processor 410 may be configured to perform the matching operation of the biometric information corresponding to the first sensor area with the pre-stored biometric information in the third period in which the video data VD is displayed after the second period extended to the second designated time, and to perform the matching operation of the biometric information corresponding to the first sensor area and the biometric information corresponding to the second sensor area with the pre-stored biometric information in the fourth period in which the video data VD is displayed after the other second period.

The electronic device 101 according to various embodiments of the disclosure may include the display 160, the biometric sensor 240I formed on at least a partial area of the display 160, and the processor 410, wherein the processor 410 may be configured to identify the user input related to the biometric authentication, and to acquire the user's biometric information related to the biometric authentication by using the biometric sensor 240I during the second period between the first period in which the provided video data VD is displayed through the display 160 and the second period in which the video data VD is not displayed at least based on the identification of the user input. The processor 410 may be configured to change the second period designated as the first designated time to the second designated time extended from the first designated time. If the acquisition of the biometric information is completed, the processor 410 may be configured to change the second period extended to the second designated time to the first designated time. The processor 410 may be configured to acquire first biometric information corresponding to at least a partial area of the biometric sensor 240I in the second period, and to acquire second biometric information corresponding to at least another partial area of the biometric sensor 240I in the other second period. The processor 410 may be configured to perform the matching operation of the first biometric information with the pre-stored biometric information in the third period in which the video data VD is displayed after the second period, and to perform the matching operation of the second biometric information with the pre-stored biometric information in the fourth period in which the video data VD is displayed after the other second period. If the matching for the first biometric information has succeeded, the processor 410 may be configured to refrain from matching the second biometric information.

Figure 4:
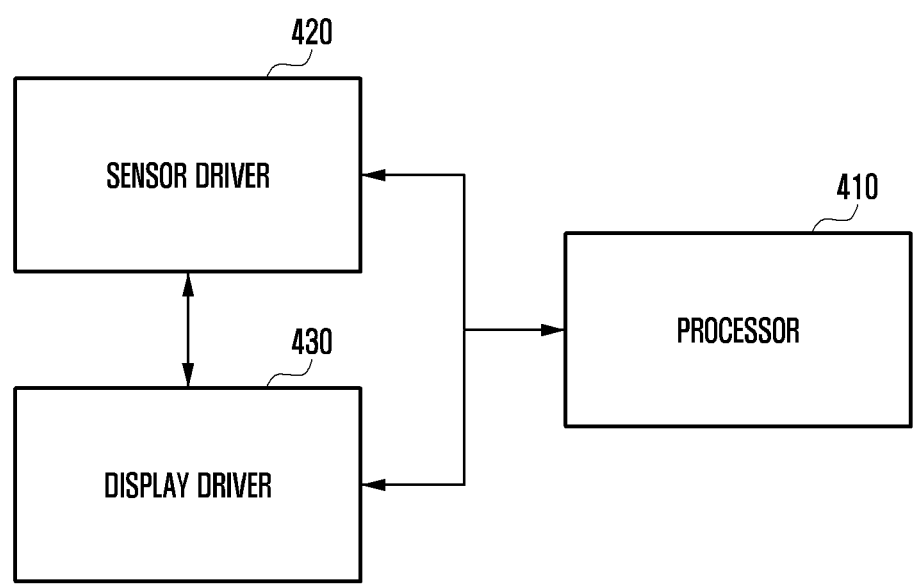
FIG. 4 is a block diagram illustrating the configuration of an electronic device according to various embodiments of the disclosure.

FIG. 4 is a block diagram illustrating the configuration of an electronic device according to various embodiments of the disclosure.

With reference to FIG. 4, an electronic device (e.g., electronic device 101) according to various embodiments may include a processor 410, a sensor driver 420, or a display driver 430.

The processor 410 (e.g., processor 120) may include, for example, an application processor 410 and a communication processor 410. According to an embodiment, the processor 410 may drive the applications and control constituent elements of the electronic device 101 (e.g., sensor driver 420 and display driver 430).

The sensor driver 420 may control, for example, a touch screen (e.g., touch panel 252) and a biometric sensor (e.g., biometric sensor 240I). According to an embodiment, the sensor driver 420 may be configured to be separated into a touch sensor driver 420 for controlling the touch screen and a biometric sensor driver 420 for controlling the biometric sensor. According to another embodiment, the touch sensor driver 420 and the biometric sensor driver 420 configured in the sensor driver 420 may be integrated into a single driver. The biometric sensor may be, for example, a proximity sensor, an illumination sensor, a fingerprint sensor, or an iris sensor. According to an embodiment, the biometric sensor may be a biometric sensor using various types. For example, the biometric sensor may be a biometric sensor configured in an ultrasonic type or in a capacitive type. According to an embodiment, at least a part of the biometric sensor may be disposed in at least a partial area of a screen area (display area) of the display (e.g., display 160).

The display driver 430 may control, for example, the display (e.g., display 160). According to an embodiment, the display driver 430, under the control of the processor 410, may differently control the display 160 based on whether the electronic device 101 is in a state where it senses the user's biometric information using the biometric sensor. For example, if the electronic device 101 is in a state where it does not sense the user's biometric information using the biometric sensor, the display driver 430 may drive the display 160 in a general type. For example, if the electronic device 101 is in a state where it senses the user's biometric information using the biometric sensor, the display driver 430 may extend a blank period between at least one signal for driving the display 160.

According to various embodiments, as described above, that the electronic device 101 drives the display 160 in a general type may mean, for example, that the electronic device 101 controls the display to display an image (i.e., image frame) based on driving of a designated refresh rate (e.g., 60 Hz).

According to various embodiments, as described above, the at least one signal for driving the display 160 may include, for example, a vertical synchronization signal V-sync, a horizontal synchronization signal H-sync, or a data enable signal DE.

According to various embodiments, the blank period may mean at least a part of a period (e.g., low period or disable state period) in which at least one signal for driving the display 160 is not output. For example, the electronic device 101 may designate any one of the at least one signal for driving the display 160 as a reference signal. For example, the electronic device 101 may designate the vertical synchronization signal V-sync as the reference signal, and it may designate at least a part of the period in which the vertical synchronization signal V-sync is not output as the blank period. Further, the electronic device 101 may designate the horizontal synchronization signal H-sync as the reference signal, and it may designate at least a part of the period in which the horizontal synchronization signal H-sync is not output as the blank period.

According to a certain embodiment, the blank period may be a period in which the processor 410 does not transmit the video data to the display 160. For example, the processor 410 may transmit the video data to the display 160 in synchronization with the data enable signal DE. For example, the processor 410 may designate the period in which the data enable signal DE is not output (e.g., low state or disable state) as the blank period, and it may not transmit the video data in the designated blank period. For example, the processor 410 may be configured to vary the length of the designated blank period based on whether the electronic device 101 is in a state where it senses the biometric information. As described above, the blank period in which the data enable signal DE is not output is at least a partial period between a first frame and a second frame, and it may include an output period of the vertical synchronization signal V-sync, a partial period before the output period of the vertical synchronization signal V-sync, or a partial period after the output period of the vertical synchronization signal V-sync. According to another embodiment, the blank period in which the data enable signal De is not output may include an output period of the horizontal synchronization signal H-sync, a partial period before the output period of the horizontal synchronization signal H-sync, or a partial period after the output period of the horizontal synchronization signal H-sync. Because the electronic device 101 according to various embodiments acquires the user's biometric information by the biometric sensor during the period in which the video data is not transmitted, mutual interference between the video data transmitted to the display 160 and the signal processed by the biometric sensor can be reduced, and accuracy of the user authentication through the user's biometric information can be heightened.

Figure 5:
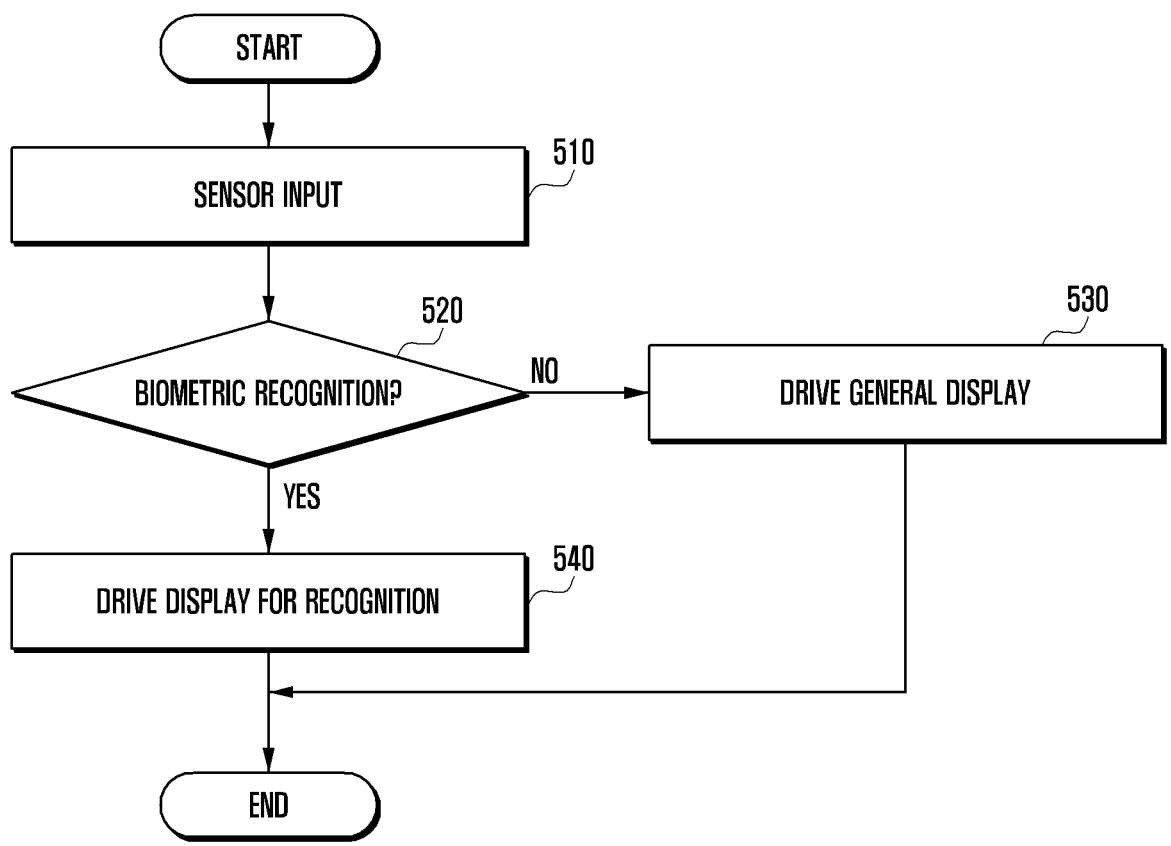
FIG. 5 is a flowchart of an operation of an electronic device according to various embodiments of the disclosure.

FIG. 5 is a flowchart of an operation of an electronic device according to various embodiments of the disclosure.

At operation 510, the electronic device 101 (e.g., processor 410) may sense a user input through, for example, the screen area of the display 160. For example, the electronic device 101 may sense a signal provided from a touch screen located on the screen area or the biometric sensor 240I. For example, the electronic device 101 may sense a user's touch input through the touch screen, or it may sense a user's fingerprint input through the biometric sensor 240I.

At operation 520, the electronic device 101 (e.g., processor 410) may determine, for example, whether the user's fingerprint input is sensed through the biometric sensor 240I. According to an embodiment, the electronic device 101 may provide a user interface for requesting the user authentication through the display 160 during execution of a specific application. According to another embodiment, if a user input through a specific key is sensed in a locked state or in a sleep state, the electronic device 101 may provide the user interface for requesting the user authentication through the display 160. For example, the electronic device 101 may determine the period in which the at least one user interface as mentioned above is provided as the state where the user's fingerprint input is sensed through the biometric sensor 240I. According to an embodiment, if the electronic device 101 is not in the state where the user's fingerprint input is sensed through the biometric sensor 240I, the electronic device 101 may perform operation 530, whereas if the electronic device 101 is in the state where the user's fingerprint input is sensed through the biometric sensor 240I, the electronic device 101 may perform operation 540.

At operation 530, the electronic device 101 (e.g., processor 410) may drive the display 160, for example, in a general type.

At operation 540, the electronic device 101 (e.g., processor 410) may drive the display 160 differently from the general type. For example, the electronic device 101 may extend the blank period between at least one signal for driving the display 160. According to a certain embodiment, the electronic device 101 may provide a user interface designated to request an input of user's biometric information, for example, fingerprint information, in addition to extending of the blank period between the signals for driving the display 160. As described above, the designated user interface may include, for example, a background image or an image effect configured to minimize a flicker phenomenon of the display 160.

Figure 6:
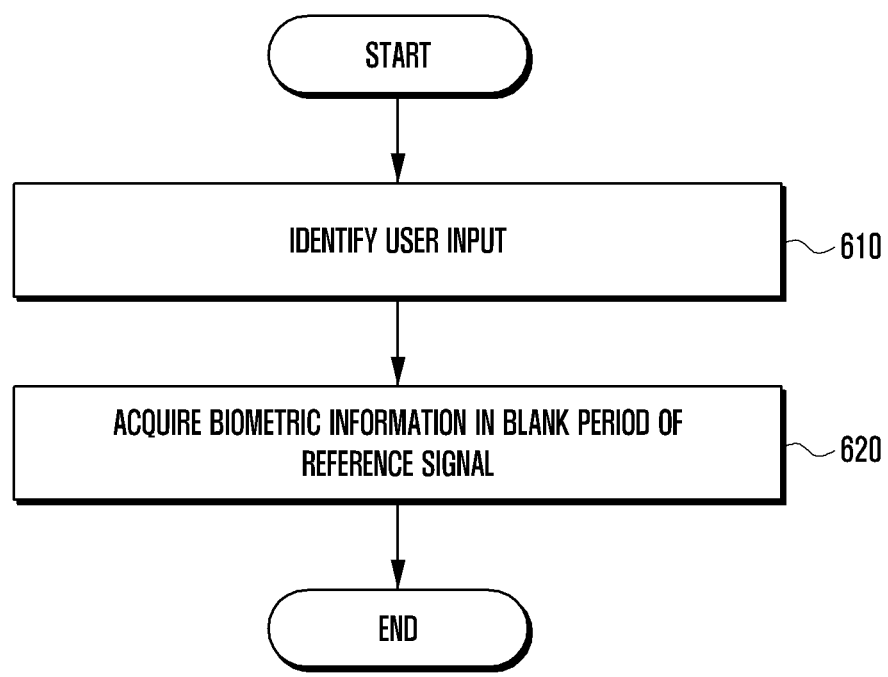
FIG. 6 is a flowchart of an operation of an electronic device according to an embodiment of the disclosure.

FIG. 6 is a flowchart of an operation of an electronic device according to an embodiment of the disclosure.

At operation 610, the processor 410 of the electronic device 101 may sense the user input related to the biometric authentication. For example, the processor 410 may trigger an operation of acquiring the biometric information based on a specific condition. For example, the processor 410 may trigger the operation of acquiring the biometric information in response to the sensing of a user's touch on at least a partial area of the display 160 designated to acquire the biometric information. For example, during execution of a specific application or in a sleep state or a locked state of the electronic device, the processor 410 may output the user interface for requiring the fingerprint authentication in response to an input of a specific key or a designated touch, and it may trigger the operation of acquiring the fingerprint information in response to the sensing of the user's touch on the at least a partial area of the display 160 designated to acquire the biometric information during the output of the user interface.

At operation 620, for example, if the operation of acquiring the biometric information is triggered, the processor 410 may acquire the biometric information in the blank period of a reference signal that is any one of a plurality of driving signals for driving the display 160. For example, the processor 410 may designate any one of the vertical synchronization signal V-sync, the horizontal synchronization signal H-sync, or the data enable signal DE as the reference signal, and it may acquire the user's biometric information by driving the biometric sensor 240I in the blank period that is at least a part of the period in which the designated reference signal is not output. According to a certain embodiment, the blank period may be a period in which the processor 410 does not transmit the video data to the display 160. For example, the processor 410 may designate the period in which the data enable signal DE is not output as the blank period, and it may not transmit the video data in the designated blank period. For example, the processor 410 may extend the designated blank period in which the video data is not transmitted, and it may acquire the user's biometric information related to the biometric authentication using the biometric sensor 240I during the extended blank period.

According to various embodiments, at operation 620, the processor 410 may be configured to extend a second period between a first period in which the video data provided through the display 160 is transmitted to the display 160 and the second period in which the video data is not transmitted to the display 160 to a time extended from a predetermined time at least based on, for example, the user's touch for triggering the acquisition of the fingerprint information.

Figure 7:
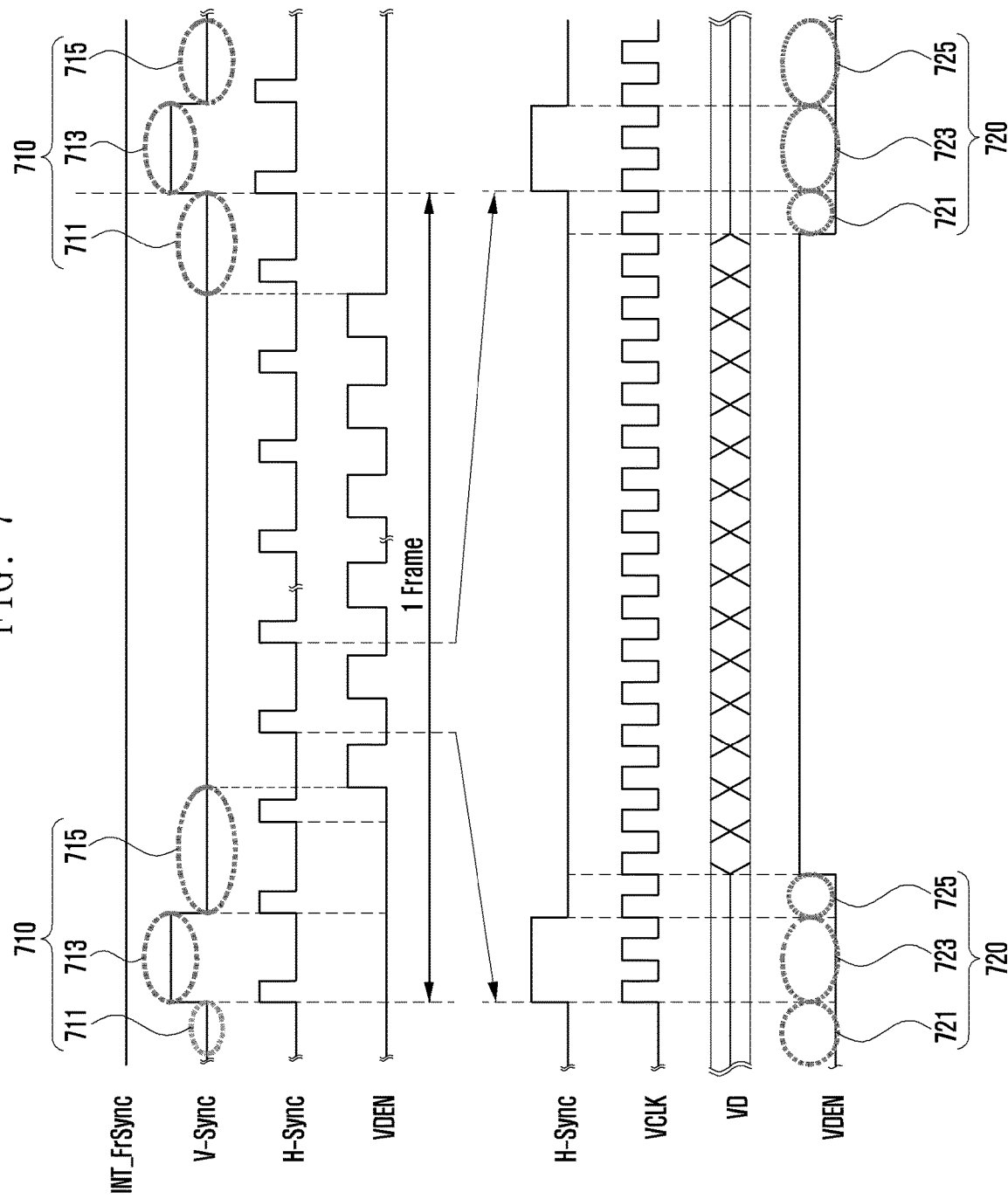
FIG. 7 is a driving waveform diagram of signals for driving a display according to various embodiments of the disclosure.

FIG. 7 is a driving waveform diagram of signals for driving a display according to various embodiments of the disclosure.

With reference to FIG. 7, signals for driving the display 160 may include, for example, INT_FrSync, V-Sync, H-Sync, VDEN, or VCLK. In FIG. 7, VD may mean a data voltage (e.g., video data) that the display driver 430 (or processor 410) supplies to the display 160.

INT_FrSync may be, for example, a synchronization signal for the display driver 430 to notify the display 160 of the start of transmission of a frame (i.e., image frame).

V-Sync may be, for example, a vertical synchronization signal defining one frame period (one image frame period). For example, a period from a time when the first V-Sync is output to a time when the second V-Sync is output may be defined as the first frame period. For example, V-Sync can define the time when a specific frame starts through shifting from a low state (disable state) to a high state (enable state).

H-Sync may be, for example, a horizontal synchronization signal defining on horizontal period. As described above, one horizontal period may mean, for example, a period in which a source driver (or data driver) configured in the display driver 430 supplies data voltages VD for one horizontal line quantity (quantity for being supplied to pixels corresponding to one row of the display) to the display 160.

VDEN may be, for example, a data enable signal DE for the display driver 430 (or processor 410) to supply the data voltage VD (e.g., video data) to the display 160. For example, the data voltage VD may be supplied from the display driver 430 to the display 160 in the period in which VDEN is in a high state.

VCLK may mean, for example, at least one clock pulse. At least one clock pulse may be used for a data shift register configured in the source driver of the display driver 430 to generate a shift clock for latching the data voltages VD for one horizontal line quantity. Further, at least one clock pulse may be used, for example, for a gate shift register configured in a gate driver of the display driver 430 to generate a scan pulse (scan signal or scanning signal) for scanning a gate line of the display 160 corresponding to one horizontal line.

According to various embodiments, the blank period 710 or 720 may be a period in which the processor 410 does not transmit the video data to the display 160. For example, because the processor 410 transmits the video data to the display 160 in synchronization with the data enable signal DE, the processor 410 may designate the period in which the data enable signal DE is not output (low state or disable state) as the blank period 710 or 720.

According to various embodiments, the blank period 710 or 720 in which the data enable signal DE is not output is at least a partial period between the first frame and the second frame, and it may include an output period 713 of the vertical synchronization signal V-Sync, a partial period 711 before the output period of the vertical synchronization signal V-Sync, or a partial period 715 after the output period of the vertical synchronization signal V-Sync. According to another embodiment, the blank period 710 or 720 in which the data enable signal DE is not output may include an output period 723 of the horizontal synchronization signal H-Sync, a partial period 721 before the output period of the horizontal synchronization signal H-Sync, or a partial period 725 after the output period of the horizontal synchronization signal H-Sync.

According to various embodiments, the processor 410 may extend at least one period of the plurality of defined blank periods, and it may acquire the user's biometric information (e.g., fingerprint information) through the biometric sensor 240I in the extended blank period. According to a certain embodiment, the processor 410 may acquire the user's biometric information through the biometric sensor 240I in the blank period corresponding to a period between the successive data enable signals VDEN. Because the electronic device 101 according to various embodiments drives the biometric sensor 240I in the blank period in which the data enable signal VDEN is in a low state, mutual interference between the video data of the display 160 and the signal sensed by the biometric sensor 240I can be reduced, and the recognition accuracy of the biometric sensor 240I can be heightened.

Figure 8:
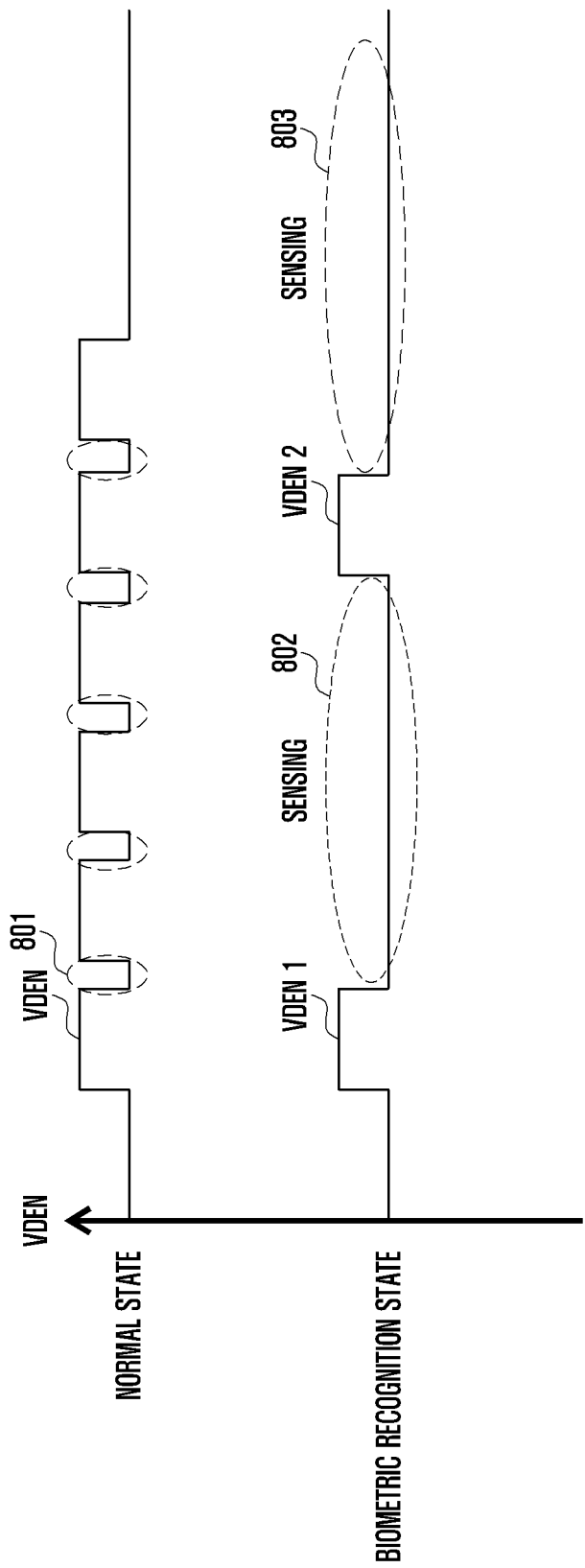
FIG. 8 is a driving waveform diagram of a signal for driving a display according to an embodiment of the disclosure.

FIG. 8 is a driving waveform diagram of a signal for driving a display according to an embodiment of the disclosure.

According to various embodiments, the electronic device 101 may define any one of a plurality of signals for driving the display 160 as a reference signal, and it may perform user authentication by acquiring and matching user's biometric information using successive blank periods between the reference signals. In the following example, it is assumed that the reference signal is the data enable signal VDEN, but the reference signal according to various embodiments may be the horizontal synchronization signal H-Sync or the vertical synchronization signal V-Sync in addition to the data enable signal VDEN.

According to a certain embodiment, in order to secure a time for acquiring the user's biometric information (e.g., fingerprint information) through the biometric sensor 240I, the electronic device 101 may extend the period for acquiring the user's biometric information using the biometric sensor 240I. For example, in a biometric recognition state, the electronic device 101 may temporarily increase the blank period of the vertical synchronization signal V-Sync or the horizontal synchronization signal H-Sync. Further, in the biometric recognition state, the electronic device 101 may adjust the blank period of at least one clock pulse (e.g., VCLK) or a refresh rate. As described above, adjustment of the refresh rate is to increase the refresh period of the image frame in comparison with that during normal driving, and it may mean to refresh a displayed image with a frame frequency that is lower than a basically set frame frequency. For example, a method for adjusting the refresh rate may include a driving method through lowering of the image frame frequency from N (N is a positive integer) Hz for the normal driving to 1 Hz to N/2 Hz.

According to an embodiment, the electronic device 101 may acquire the user's biometric information using the biometric sensor 240I in the blank period in which the data enable signal VDEN for driving the display 160 is in a low state. For example, the electronic device 101 may extend the blank period in a state where the user's fingerprint input is sensed.

With reference to FIG. 8, in a state where the user's fingerprint input is not sensed through the biometric sensor 240I (i.e., normal state), the electronic device 101 (e.g., processor 410) according to an embodiment may set the blank period between the successive data enable signals VDEN to a first time 801. For example, in a state where the user's fingerprint input is sensed (i.e., sensing state) through the biometric sensor 240I, the electronic device 101 may set the blank period between the successive data enable signals VDEN to a second time 802 that is longer than the first time 801. For example, the electronic device 101 may acquire the user's biometric information (e.g., fingerprint information) by driving the biometric sensor 240I during the blank period set to the second time 802.

According to another embodiment, in the biometric recognition state, the electronic device 101 may set the blank period corresponding to a period between a first data enable signal VDEN1 and a second data enable signal VDEN2 to the second time 802 that is longer than the first time 801, and it may set the blank period corresponding to a period between the second data enable signal VDEN2 and a third data enable signal (not illustrated) to a third time 803 that is longer than the first time 801. For example, the electronic device 101 may equally set the second time 802 and the third time 803. According to a certain embodiment, the electronic device 101 may set the second time 802 and the third time 803 to be different from each other. For example, if all the user's biometric information is acquired (or minimum biometric information required for the user authentication is acquired) during the blank period of the second time 802 that is the period between the first data enable signal VDEN1 and the second data enable signal VDEN2, the electronic device 101 may set the length of the blank period of the third time 803 that is the period between the second data enable signal VDEN2 and the third data enable signal (not illustrated) to be shorter than the second time 802. For example, the electronic device 101 may set the third time 803 equally or similar to the first time 801.

According to various embodiments, the electronic device 101 may dynamically set the lengths of the second time 802 and the third time 803 based on situation information of the electronic device. For example, the electronic device 101 may variously set the lengths of the second time 802 and the third time 803 in accordance with the function being performed in the period of the second time 802 or the period of the third time 803 (e.g., being performed on background). In another embodiment, the electronic device 101 may variously vary the lengths of the second time 802 and the third time 803 based on attributes of the image being displayed on the display (e.g., change of the image being displayed in the period of the second time 802 or the period of the third time 803 or the image to be displayed after the period of the second time 802 or the period of the third time 803, or the color of the image being displayed in the area corresponding to the location of the biometric sensor).

Figure 9:
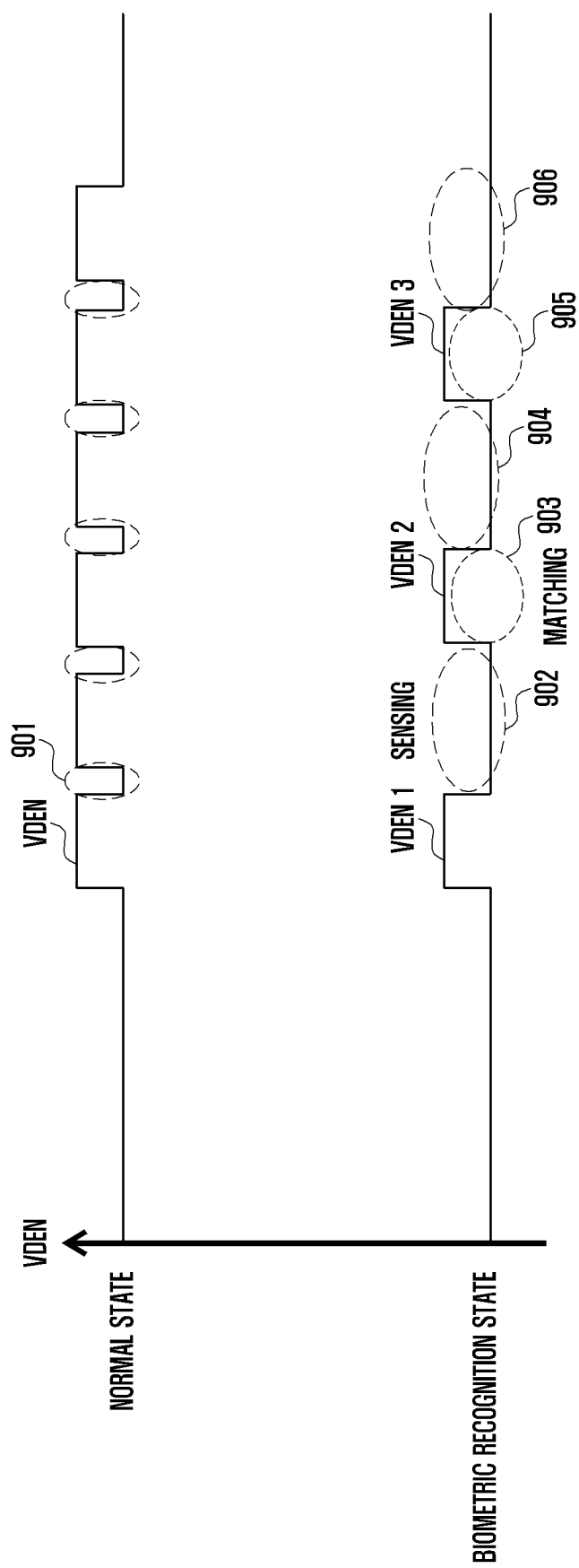
FIG. 9 is a driving waveform diagram of a signal for driving a display according to another embodiment of the disclosure.

FIG. 9 is a driving waveform diagram of a signal for driving a display 160 according to another embodiment of the disclosure.

According to various embodiments, the electronic device 101 may define any one of a plurality of signals for driving the display 160 as a reference signal, and it may perform user authentication by partially acquiring and matching user's biometric information using successive blank periods between the reference signals. In the following example, it is assumed that the reference signal is the data enable signal VDEN, but the reference signal may be the horizontal synchronization signal H-Sync or the vertical synchronization signal V-Sync in addition to the data enable signal VDEN.

According to a certain embodiment, the electronic device 101 may acquire the user's biometric information using the blank period of the at least one signal for driving the display 160, and it may perform user authentication by partially acquiring and matching the user's biometric information during successive blank periods. For example, in the electronic device 101, a screen area of the display 160 may include a specific area for sensing the biometric information (i.e., area on which a user inputs fingerprint information), and the specific area may be predefined to be divided into a plurality of sub-areas. For example, the electronic device 101 may partially acquire the user's biometric information through at least one area selected among the plurality of sub-areas in each blank period, and it may identify whether the biometric information partially acquired during the period in which at least one signal for driving the display 160 is output matches pre-stored biometric information in succession with the corresponding blank period.

With reference to FIG. 9, in a state where the user's fingerprint input is not sensed through the biometric sensor 240I (i.e., normal state), the electronic device 101 according to another embodiment may set the blank period between the successive data enable signals VDEN to a first time 901.

For example, in a biometric recognition state, the electronic device 101 may set the blank period corresponding to a period between the first data enable signal VDEN1 and the second data enable signal VDEN2 to a second time 902 that is longer than the first time 901, set the blank period corresponding to a period between the second data enable signal VDEN2 and a third data enable signal VDEN3 to a third time 904 that is longer than the first time 901, and set the blank period corresponding to a period between the third data enable signal VDEN3 and a fourth data enable signal (not illustrated) to a fourth time 906 that is longer than the first time 901.

For example, the electronic device 101 may acquire a part of the user's biometric information through any one area located on the screen during the blank period of the second time 902 and selected among the plurality of sub-areas for acquiring the biometric information. For example, the electronic device 101 may compare the part of the user's biometric information acquired in the blank period of the second time 902 with pre-stored biometric information during an output period of the second data enable signal VDEN2 after the blank period of the second time 902 to identify whether the acquired user's biometric information matches the pre-stored biometric information. For example, the electronic device 101 may be switched to a normal driving state if the acquired user's biometric information and the pre-stored biometric information match each other.

For example, if the acquired user's biometric information and the pre-stored biometric information do not match each other, the electronic device 101 may acquire another part of the user's biometric information through another area located on the screen during the blank period of the third time 904 and selected among the plurality of sub-areas for acquiring the biometric information. For example, the electronic device 101 may compare the part of the user's biometric information acquired in the blank period of the third time 904 with the pre-stored biometric information during an output period of the third data enable signal VDEN3 after the blank period of the third time 904 to identify whether the acquired user's biometric information matches the pre-stored biometric information. For example, the electronic device 101 may be switched to the normal driving state if the acquired user's biometric information and the pre-stored biometric information match each other.

For example, if the acquired user's biometric information and the pre-stored biometric information do not match each other, the electronic device 101 may acquire still another part of the user's biometric information through still another area located on the screen during the blank period of the fourth time 906 and selected among the plurality of sub-areas for acquiring the biometric information. For example, the electronic device 101 may compare the part of the user's biometric information acquired in the blank period of the fourth time 906 with the pre-stored biometric information during an output period of the fourth data enable signal (not illustrated) after the blank period of the fourth time 906 to identify whether the acquired user's biometric information matches the pre-stored biometric information.

According to a certain embodiment, the electronic device 101 may set the second time to the fourth time 902, 904, and 906 equally or similar to the first time 901.

According to various embodiments of the disclosure, in order to increase the blank period for acquiring the biometric information, the electronic device 101 may control the processor or the display driver 430 IC (DDI) as follows.

1. In the Case where an Electronic Device is in a Normal Mode 1.1. A fingerprint sensing mode may be activated based on sensor data collection through a sensor (e.g., touch sensor or fingerprint sensor) included in the display 160, an operation state of the electronic device 101, or user interfaces (UI)/user experience (UX) scenarios.

1.2. The application processor (AP) (e.g., processor 410) may transmit a specific command to the DDI 430, and the DDI 430 may extend the blank period in response to the specific command (i.e., the DDI 430 can extend the blank period based on the condition mentioned at 1.1 without the control of the separate application processor 410).

1.3. The DDI 430 may start extension of the blank period in synchronization with the vertical synchronization signal V-Sync and/or the horizontal synchronization signal H-Sync at a frame start time.

1.4. If the blank period is extended, it is possible to start fingerprint sensing after identifying whether a flicker occurs.

1.4.1. The DDI 430 or the processor 410 may identify a level at which a flicker of an image can occur as the blank period is extended. As described above, the level for determining whether the flicker occurs may be a refresh rate, and the DDI 430 or the processor 410 may determine that the flicker can occur if the refresh rate is equal to or lower than 50. Representatively, in addition to the refresh rate, the DDI 430 or the processor 410 may consider a threshold, such as a frame rate, as a reference for determining whether the flicker occurs. According to an embodiment, the DDI 430 or the processor 410 may partially acquire and match the fingerprint information based on the change of the refresh rate in accordance with the extension of the blank period.

1.4.2. If it is determined that the flicker occurs, the DDI 430 or the processor 410 may reduce the brightness of a background image being output through the display 160 and/or it may output the background image capable of minimizing the flicker recognition through the display 160.

1.5. If the fingerprint sensing is completed, the DDI 430 or the processor 410 may be switched to a normal driving state.

2. In the Case where an Electronic Device is in a Self-Refresh State or in a Low Power State 2.1. The processor 410 is in a sleep state, and a fingerprint sensing mode may be activated based on sensor data collection through a sensor (e.g., touch sensor or fingerprint sensor) included in the display 160, an operation state of the electronic device 101, or user interfaces (UI) & user experience (UX) scenarios.

2.2. A specific screen (may be a background image equal or similar to that at 1.4.2.) may be output using a frame buffer included in the DDE 430, and the blank period may be extended. The DDI 430 may identify whether the acquired fingerprint information and the stored fingerprint information match each other, and if the two kinds of information match each other, the DDI 430 may make the processor 410 wake up to transmit the acquired fingerprint data to the processor 410.

2.3. If the fingerprint sensing is completed, the DDI 430 or the processor 410 may be switched to a normal driving state.

Figure 10A:
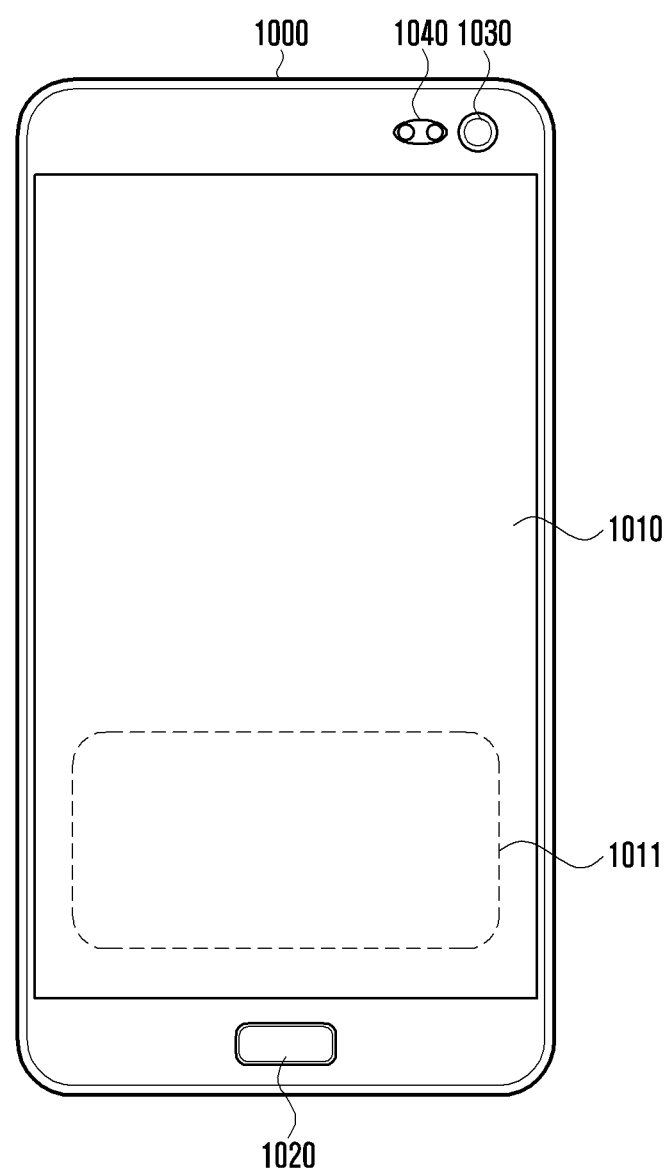
FIG. 10A is a diagram of an example of an electronic device according to various embodiments of the disclosure.
Figure 10B:
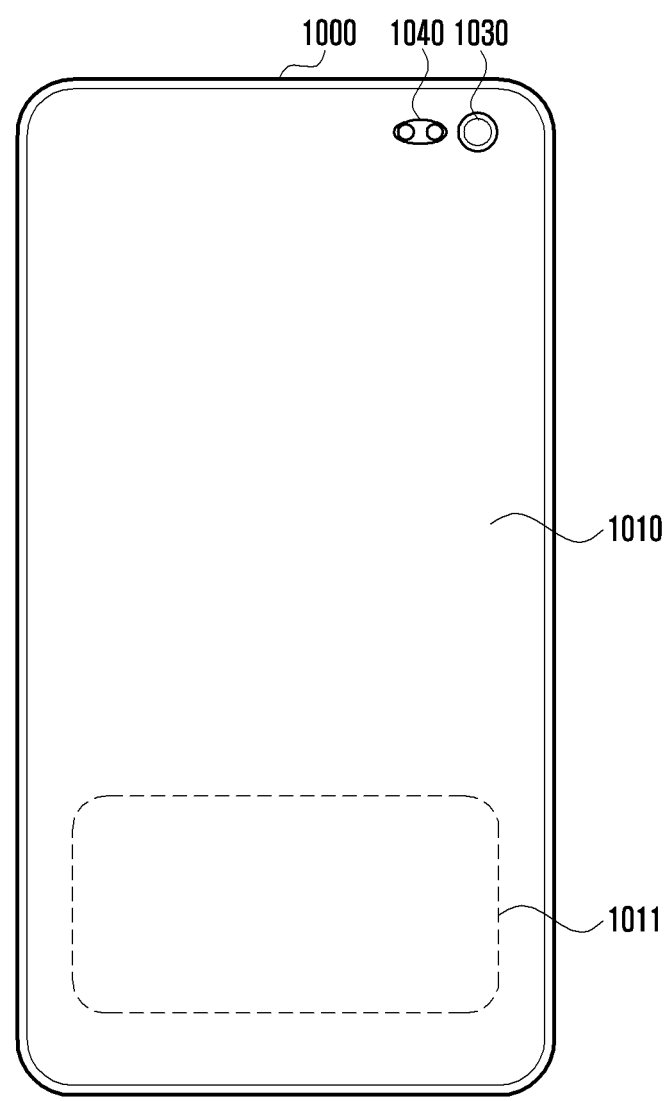
FIG. 10B is a diagram of an example of an electronic device according to various embodiments of the disclosure.

FIGS. 10A and 10B are diagrams illustrating examples of an electronic device 101 according to various embodiments of the disclosure.

With reference to FIG. 10A, a display 1010 (e.g., display 160) may be disposed on a front surface of an electronic device 1000 (e.g., electronic device 101) according to an embodiment, and a biometric sensor 1011 (e.g., biometric sensor 240I) may be located corresponding to at least a part of a screen area of the display 1010. According to an embodiment, an operation button (e.g., home button) 1020 may be disposed on one side (e.g., lower side) of the screen area of the display 1010, and a camera 1030 and at least one sensor 1040 may be disposed on the other side (e.g., upper side) of the screen area of the display 1010. According to an embodiment, the biometric sensor 1011 may be formed in an active area or a black matrix area of the display 1010.

As described above, location of the biometric sensor 1011 to correspond to at least a part of the screen area of the display 1010 may mean, for example, disposal of the biometric sensor 1011 inside at least a partial area of the display 1010, or disposal of the biometric sensor 1011 on an upper portion of the display 1010 to overlap the at least a partial area of the display 1010, or disposal of the biometric sensor 1011 on a lower portion of the display 1010 to overlap the at least a partial area of the display 1010. Further, if the biometric sensor 1011 is disposed on the upper portion or the lower portion of the display 1010, the biometric sensor 1011 may be directly attached to the surface (upper surface or lower surface) of the display 1010 through an adhesive layer (not illustrated). Further, if the biometric sensor 1011 is disposed on the upper portion or the lower portion of the display 1010, at least one other component may be disposed between the biometric sensor 1011 and the display 1010. According to an embodiment, the biometric sensor 1011 may be disposed on the lower portion of the display 1010. For example, the biometric sensor 1011 may acquire biometric information of an object (e.g., user's fingerprint) approaching a specific area of the display 1010 corresponding to the biometric sensor 1011.

With reference to FIG. 10B, the screen area of the display 1010 may be extended over the whole front surface of the electronic device 1000 according to a certain embodiment, and the biometric sensor 1011 may be located on at least a part of the screen area. According to an embodiment of the disclosure, the biometric sensor 1011 may be disposed on the lower portion of the screen area. The forming location of the biometric sensor 1011 according to various embodiments of the disclosure will be described in detail later with reference to FIG. 5. For example, a physical key (e.g., user operation button 1020) may be deleted from the front surface of the electronic device 1000, and the screen area may be extended to the area from which the physical key 1020 is deleted (e.g., lower area on which a home button is located on the front surface of the electronic device) and the area on which a camera 1030 and at least one sensor 1040 are located (e.g., upper area of the front surface of the electronic device). According to a certain embodiment, the camera 1030 and the at least one sensor 1040 may be disposed on at least a part of the screen area of the display 1010. According to a certain embodiment, on at least a part of the screen area from which the physical key 1020 is deleted, a user operation button using a touch sensor or a pressure sensor may be disposed in replacement of the physical key 1020. As described above, extension of the screen area of the display 1010 may mean that an area occupied by the screen area of the display 1010 is further widened in the electronic device 1000 having the same size. For example, the area occupied by the screen area of the display 1010 as illustrated in FIG. 10B may be wider than the area occupied by the screen area of the display as illustrated in FIG. 10A.

Figure 11:
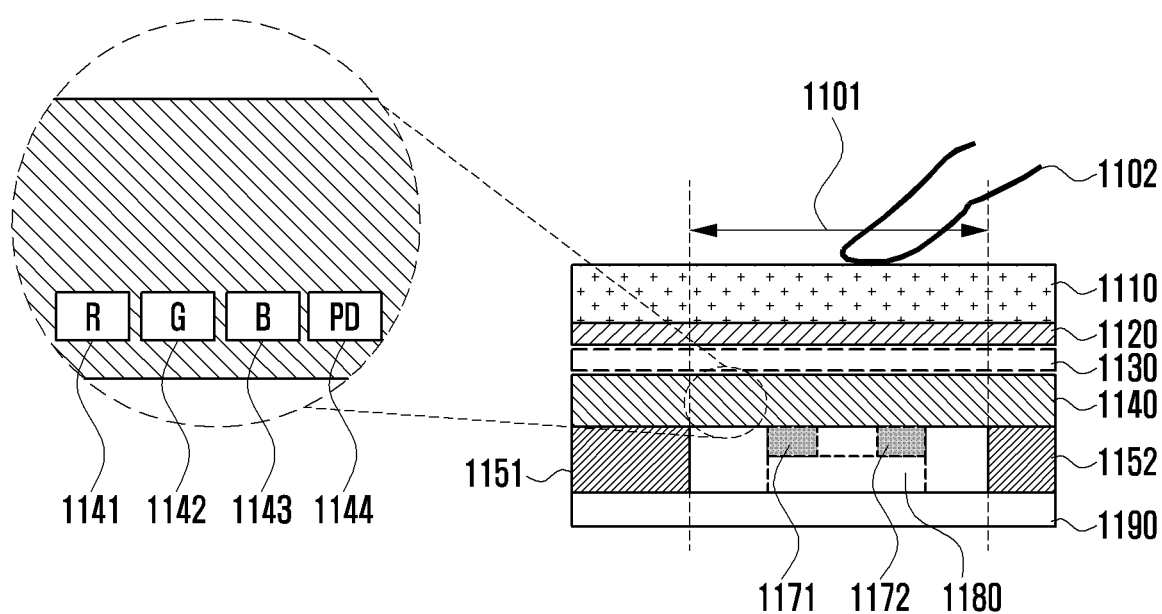
FIG. 11 is a cross-sectional view of an electronic device illustrating a structure in which a biometric sensor is mounted on a screen area of a display.

FIG. 11 is a cross-sectional view of an electronic device 101 illustrating a structure in which a biometric sensor 240I is mounted on a screen area of a display 160.

With reference to FIG. 11, the cross-sectional structure of the electronic device (e.g., electronic device 1000) according to various embodiments may include, for example, a glass 1110, an adhesive layer 1120, a touch sensor 1130 (e.g., touch panel 252), a display 1140 (e.g., display 160), or a PCB 1190.

According to various embodiments, on the electronic device 1000, biometric sensors 1130, 1144, and 1180 (e.g., biometric sensor 911) for sensing user's biometric information may be mounted corresponding to at least a partial area 1101 of the display 1140. According to various embodiments, at least a partial area 1101 of the display 1140 may be an area that is equal to or similar to the area on which the biometric sensor 1011 is formed among the screen areas of the display 1010. According to a certain embodiment, the biometric sensor 1130, 1144, or 1180 may be located to correspond to a partial area (e.g., one area or a plurality of areas) of the display 1140, or it may be located to correspond to the whole screen area of the display 1140 (e.g., active area of the display).

The biometric sensor 1130, 1144, or 1180 may be, for example, the biometric sensor 1130 located on the upper portion of the display 1140 (upside direction of FIG. 11), the biometric sensor 1144 built in at least the partial area of the display 1140, or the biometric sensor 1180 located on the lower portion of the display 1140 (lower side direction of FIG. 11). According to an embodiment, the biometric sensor 1130, 1144, or 1180 may include an optical type image sensor, an ultrasonic type transmission/reception module, or a capacitive type transmission/reception electrode pattern.

According to an embodiment, the biometric sensor 1130 may be located between the adhesive layer 1120 and the display 1140. Further, although not illustrated, the biometric sensor 1130 may be located between the glass 1110 and the adhesive layer 1120. According to an embodiment, the biometric sensor 1130 may be configured to include a capacitive type transmission/reception electrode pattern, and in order to heighten the transmittance of light output from the display 1140, it may be formed of a transparent electrode. According to an embodiment, the biometric sensor 1130 may also include an ultrasonic type transmission/reception module.

According to another embodiment, the biometric sensor 1144 may be formed in an active area or a black matrix area of the display 1140. For example, the biometric sensor 1144 may be composed of a photo diode PD or a photo transistor located on the same layer as at least a part of a red pixel 1141, a green pixel 1142, or a blue pixel 1143 constituting the display 1140. According to an embodiment, the biometric sensor 1144 may be an optical fingerprint sensor using the light output from the display 1140 as a light source. For example, the biometric sensor 1144 may acquire user's fingerprint information 1102 by sensing the light that is output from the display 1140 and then is reflected from the user's fingerprint. According to another embodiment, the optically configured biometric sensor 1144 may acquire the user's fingerprint information 1102 by using the light output by an optical source device provided separately from the display 1140 as the light source. As described above, the light source device provided separately from the display 1140 may be, for example, an infrared light emitting diode (infrared LED) (not illustrated). The infrared LED may be located, for example, on a lower portion of the display 1140 or on a part of an edge area of the display 1140.

According to a certain embodiment, the biometric sensor 1180 may be located on the lower portion of the display 1140. For example, on the lower portion of the display 1140, the biometric sensor 1180 and sealing structures 1151 and 1152 for securing a mount space of the biometric sensor 1180 may be located. According to an embodiment, the biometric sensor 1180 may be an optical fingerprint sensor using the light output from the display 1140 as a light source. According to another embodiment, the biometric sensor 1180 may acquire the user's fingerprint information 1102 using the light output from the light source device provided separately from the display 1140 as a light source. The sealing structures 1151 and 1152 may be, for example, to protect the biometric sensor 1180 from an external impact. According to an embodiment, the biometric sensor 1180 may be located in an inner space (e.g., space between the sealing structures 1151 and 1152) formed by the sealing structures 1151 and 1152. The biometric sensor 1180 may be formed, for example, on a base substrate 1190 and it may be located between the display 1140 and the substrate 1190. Between the biometric sensor 1180 and the display 1140, for example, elastic materials 1171 and 1172 (e.g., plastic, sponge, or rubber) to absorb impact or to prevent an inflow of foreign substances may be formed.

Figure 12:
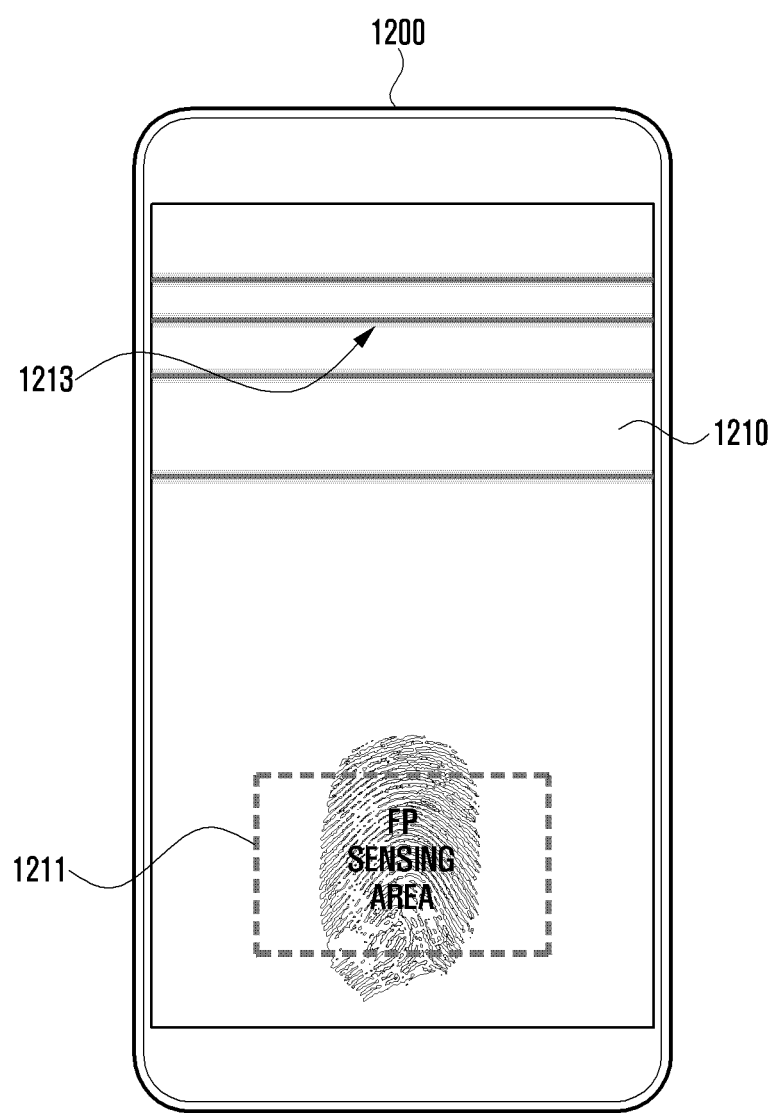
FIG. 12 is an exemplary diagram explaining a method for reducing a flicker phenomenon if an electronic device is in a biometric recognition state according to various embodiments of the disclosure.

FIG. 12 is an exemplary diagram explaining a method for reducing a flicker phenomenon if an electronic device 101 is in a biometric recognition state according to various embodiments of the disclosure.

According to an embodiment, the electronic device 101 may extend the blank period between the signals for driving the display 1040 (e.g., display 160), and it may also provide a designated user interface while requesting an input of user's biometric information, for example, fingerprint information. As described above, the designated user interface may include, for example, a background image configured to minimize a flicker phenomenon of the display 1040. According to a certain embodiment, the DDI 430 or the processor 410 may extend the blank period in a fingerprint recognition state, and it may predict whether the flicker occurs due to the extension of the blank period. For example, the DDI 430 or the processor 410 may compare the refresh rate that is adjusted due to the extension of the blank period with a pre-stored threshold value, and it may determine whether the flicker occurs based on the result of the comparison.

Figure 13:
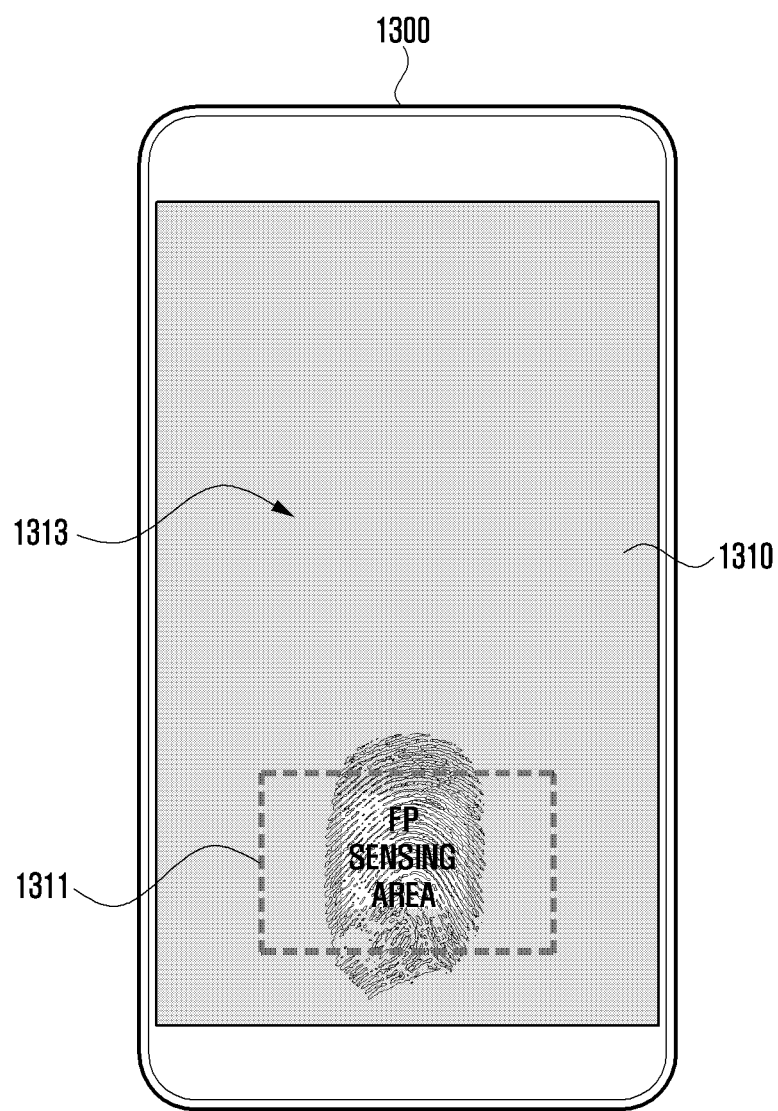
FIG. 13 is an exemplary diagram explaining another method for reducing a flicker phenomenon.

According to an embodiment, if it is determined that the flicker occurs, the DDI 430 or the processor 410 may reduce brightness of a background image output through the display 1040 and/or it may output the background image capable of minimizing the flicker recognition through the display 1040. For example, if it is determined that the flicker occurs, as illustrated in FIG. 12, the DDI 430 or the processor 410 may display a UI including the flicker (e.g., effect in which one scanning line comes down toward a finger portion like retina scanning), and thus it can prevent a user from recognizing the flicker occurrence in order to acquire the biometric information. If it is determined that the flicker occurs, as illustrated in FIG. 13, the DDI 430 or the processor 410 may adjust to darken the brightness of the display 1040 to be equal to or lower than a specific brightness to weaken the user's recognition of the flicker.

According to various embodiments, the electronic device 101 may select at least one of a plurality of flicker reduction methods at least based on situation information of the electronic device 101. For example, the electronic device 101 may select a flicker reduction method based on the surrounding illumination, the kind of content being currently displayed on the display 1040, an application being currently driven, or the location of the finger. According to various embodiments, the flicker reduction method can be selectively provided by partially controlling the display 1040.

Figure 14:
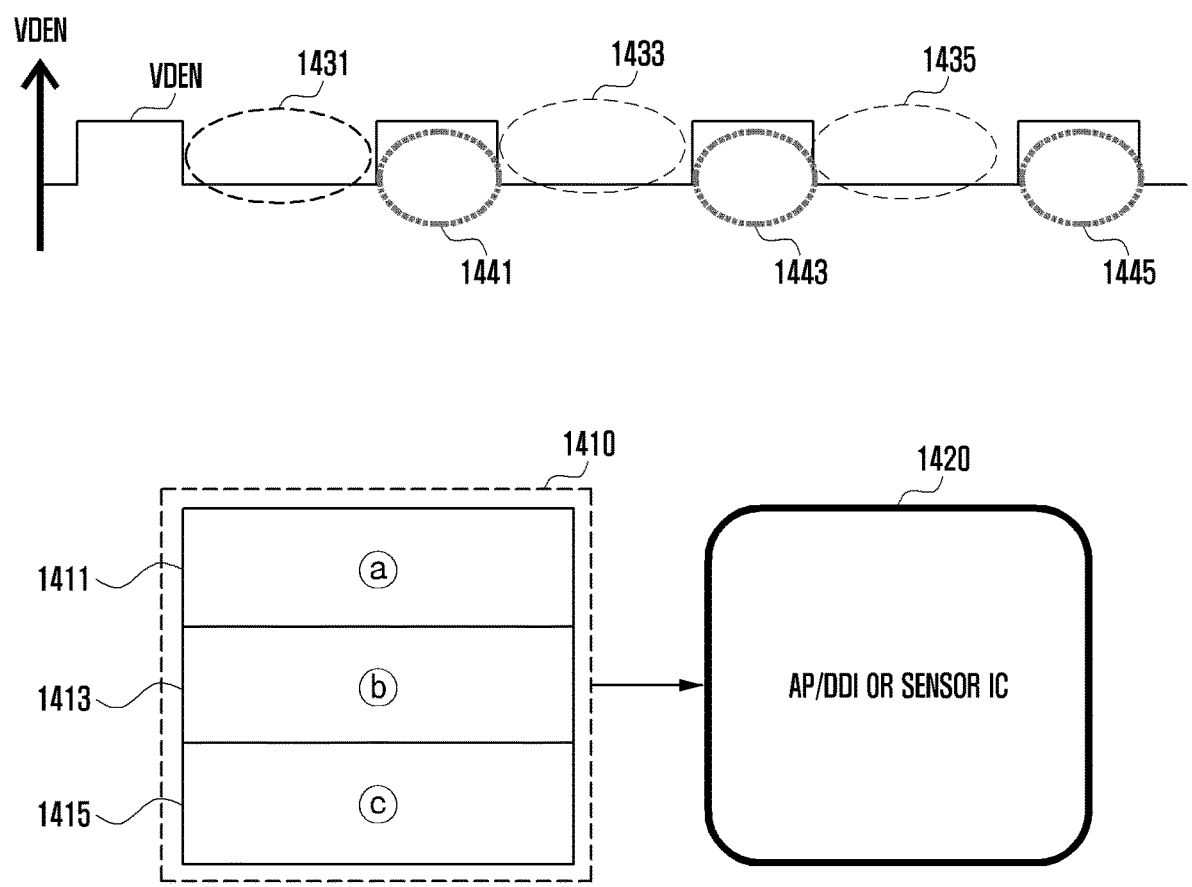
FIG. 14 is a diagram explaining a method in which an electronic device according to various embodiments of the disclosure performs user authentication by partially acquiring and matching user's biometric information during a successive blank period.
Figure 15:
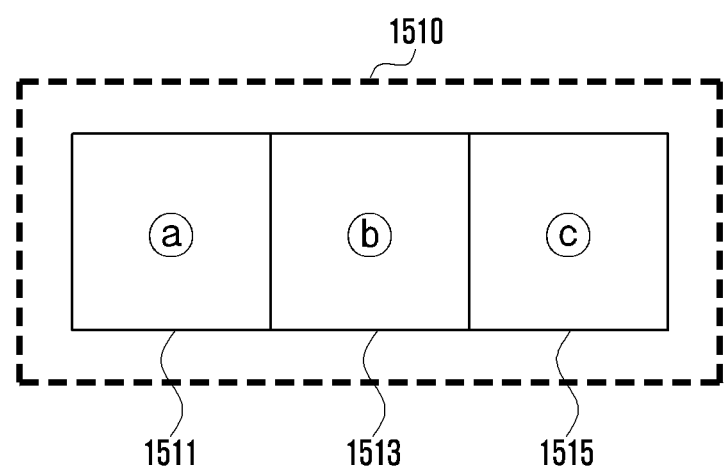
FIG. 15 is a diagram explaining a fingerprint sensing area according to various embodiments.

FIG. 14 is a diagram explaining a method in which an electronic device 101 according to various embodiments of the disclosure performs user authentication by partially acquiring and matching user's biometric information during a successive blank period. FIG. 15 is a diagram explaining a fingerprint sensing area according to various embodiments.

With reference to FIG. 14, the electronic device 101 may define to divide a specific area 1410 located on at least a part of the screen area of the display into a plurality of sub-areas 1411, 1413, and 1415 to sense the biometric information. According to an embodiment, the plurality of sub-areas 1411, 1413, and 1415 may include a first sub-area 1411, a second sub-area 1413, or a third sub-area 1415. For example, as illustrated in FIG. 14, the first to third sub-areas 1411, 1413, and 1415 may be arranged in a vertical direction, and they may have the same area. According to another embodiment, as illustrated in FIG. 15, the first to third sub-areas 1511, 1513, and 1515 of the specific area 1510 (e.g., specific area 1410) may be arranged in a horizontal direction and they may have the same area. Alternatively, the first to third sub-areas 1511, 1513, and 1515 may be divided without limiting their shapes in consideration of usability, such as a slanting line/straight line/circle.

According to an embodiment, the electronic device 101 may partially acquire the user's biometric information during the blank periods 1411, 1433, and 1435 between data enable signals VDEN.

For example, the electronic device 101 may acquire a part of the user's biometric information by driving the biometric sensor 240I (e.g., fingerprint sensor) located in the first sub-area 1411 during the first blank period 1431 between the data enable signals VDEN, and it may transmit the acquired information to the processor 410 (e.g., application processor 410), the DDI 1420, or the sensor IC. According to an embodiment, the processor 410 of the electronic device 101 may compare a part of the user's biometric information acquired in the first blank period 1431 with pre-stored biometric information during an output period 1441 of the data enable signal VDEN2 after the first blank period 1431 to identify whether the acquired user's biometric information and the pre-stored biometric information match each other. According to an embodiment, in order to reduce an operation amount, the electronic device 101 may identify whether the part of the user's biometric information acquired through the first sub-area 1411 matches the biometric information in the location corresponding to the first sub-area 1411 among the pre-stored biometric information. For example, if the acquired user's biometric information and the pre-stored biometric information match each other, the electronic device 101 may be switched to a normal driving state.

For example, if the acquired user's biometric information and the pre-stored biometric information do not match each other, the electronic device 101 may acquire a part of the user's biometric information by driving the biometric sensor 240I (e.g., fingerprint sensor) located in the second sub-area 1413 during the second blank period 1433 between the data enable signals VDEN, and it may transmit the acquired information to the processor 410 (e.g., application processor 410), the DDI 1420, or the sensor IC. According to an embodiment, the processor 410 of the electronic device 101 may compare the part of the user's biometric information acquired in the first and second blank periods 1431 and 1433 with the pre-stored biometric information during an output period 1443 of the data enable signal VDEN after the second blank period 1433 to identify whether the acquired user's biometric information and the pre-stored biometric information match each other. According to an embodiment, in order to reduce the operation amount, the electronic device 101 may identify whether the part of the user's biometric information acquired through the second sub-area 1413 matches the biometric information in the location corresponding to the second sub-area 1413 among the pre-stored biometric information. According to another embodiment, the electronic device 101 may identify whether the part of the user's biometric information acquired through the first and second sub-areas 1411 and 1413 matches the biometric information in the location corresponding to the first and second sub-areas 1411 and 1413 among the pre-stored biometric information. For example, if the acquired user's biometric information and the pre-stored biometric information match each other, the electronic device 101 may be switched to a normal driving state.

For example, if the acquired user's biometric information and the pre-stored biometric information do not match each other, the electronic device 101 may acquire the part of the user's biometric information by driving the biometric sensor 240I (e.g., fingerprint sensor) located in the third sub-area 1415 during the third blank period 1435 between the data enable signals VDEN, and it may transmit the acquired information to the processor 410 (e.g., application processor), the DDI 1420 (e.g., DDI 430), or the sensor IC (e.g., sensor driver 420). According to an embodiment, the processor 410 of the electronic device 101 may compare the part of the user's biometric information acquired in the first to third blank periods 1431, 1433, and 1435 with the pre-stored biometric information during an output period 1445 of the data enable signal VDEN after the third blank period 1435 to identify whether the acquired user's biometric information and the pre-stored biometric information match each other. According to an embodiment, in order to reduce the operation amount, the electronic device 101 may identify whether the part of the user's biometric information acquired through the third sub-area 1415 matches the biometric information in the location corresponding to the third sub-area 1415 among the pre-stored biometric information. According to another embodiment, the electronic device 101 may identify whether the part of the user's biometric information acquired through the first to third sub-areas 1411 to 1415 matches the biometric information in the location corresponding to the first to third sub-areas 1411 to 1415 among the pre-stored biometric information. According to various embodiments, the electronic device 101 may perform the matching operation in the normal driving state after acquiring the biometric information of all areas (e.g., first to third sub-areas 1411 to 1415). For example, the electronic device 101 may be switched to the normal driving state if the acquired user's biometric information and the pre-stored biometric information match each other. For example, if the acquired user's biometric information and the pre-stored biometric information do not match each other, the electronic device 101 may determine that the user authentication has failed, and it may output a message for notifying of the failure of the user authentication through the display 1040.

Figure 16A:
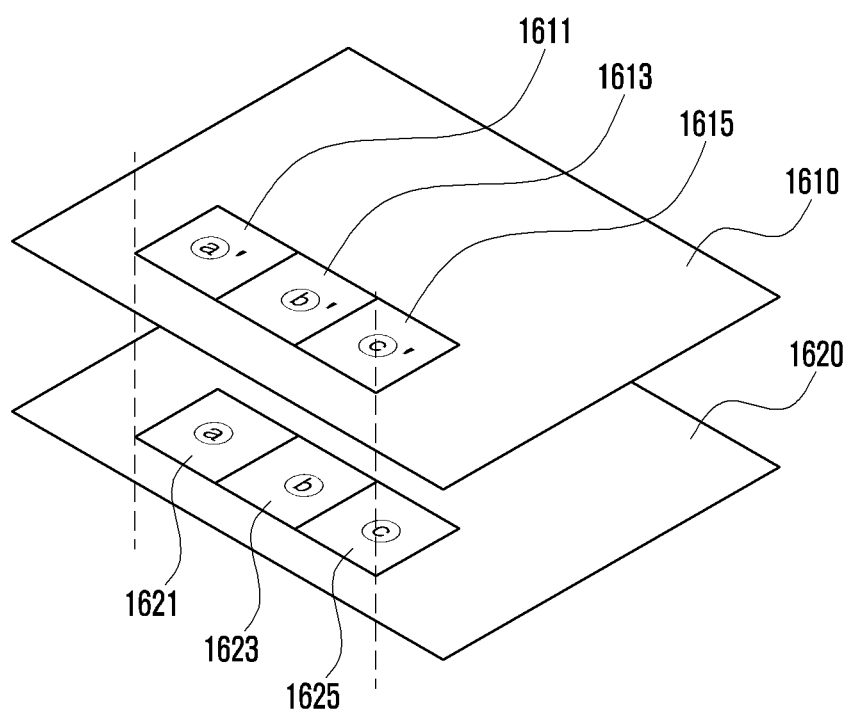
FIG. 16A is an exemplary diagram illustrating a method for acquiring biometric information in accordance with a laminated structure of a display and a biometric sensor.
Figure 16B:
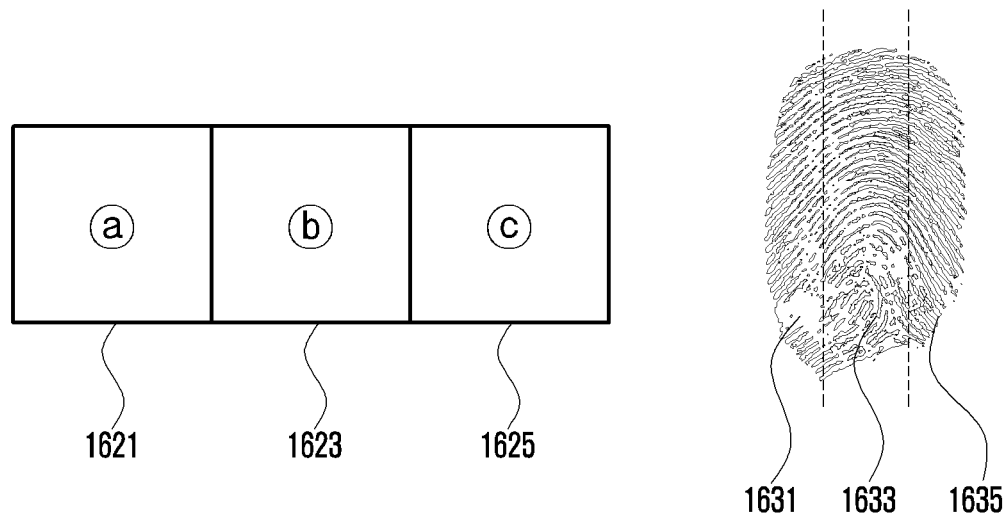
FIG. 16B is an exemplary diagram illustrating a method for acquiring biometric information in accordance with a laminated structure of a display and a biometric sensor.

FIGS. 16A and 16B are exemplary diagrams illustrating a method for acquiring biometric information in accordance with a laminated structure of a display and a biometric sensor.

With reference to FIGS. 16A and 16B, an electronic device according to various embodiments may include a display 1610 (e.g., display 260) or a biometric sensor 1620 (e.g., biometric sensor 240J) located on a lower portion of the display 1610.

The screen area of the display 1610 may include, for example, sensing areas 1611, 1613, and 1615 provided on at least a part of the screen area to acquire the user's biometric information. For example, the sensing areas 1611, 1613, and 1615 of the display 1610 may be located to overlap at least parts 1621, 1623, and 1625 of the biometric sensor 1620.

For example, the sensing areas 1611, 1613, and 1615 of the display 1610 may include the first to third sub-areas 1611, 1613, and 1615, and the first to third sub-areas 1611, 1613, and 1615 may have areas equal to or similar to the areas of the first to third sensor areas 1621, 1623, and 1625 of the biometric sensor 1620. For example, the areas of ⓐ' area, ⓑ' area, and ⓒ' area corresponding to the first to third sub-areas 1611, 1613, and 1615, respectively, may be equal or similar to the areas of ⓐ area, ⓑ area, and ⓓ area corresponding to the first to third sensor areas 1621, 1623, and 1625, respectively.

According to an embodiment, the electronic device may acquire the user's biometric information partially and successively by successively driving the first to third sensor areas 1621, 1623, and 1625. For example, the electronic device may acquire information of a first portion 1631 among the user's biometric information (e.g., fingerprint information) by driving the first sensor area 1621 of the biometric sensor 1620, acquire information of a second portion 1633 among the user's biometric information by driving the second sensor area 1623 of the biometric sensor 1620, and acquire information of a third portion 1635 among the user's biometric information by driving the third sensor area 1625 of the biometric sensor 1620.

According to various embodiments, the biometric sensor may be configured in a capacitive type, an optical type, or an ultrasonic type. According to an embodiment, in the case of acquiring the biometric information in the blank period of a reference signal that is any one of a plurality of signals for driving the display using the biometric sensor, the electronic device may drive the biometric sensor through division of the biometric sensor by areas. For example, in the case of the biometric sensor configured in an optical type, the electronic device may separately control light sources by areas. For example, the electronic device may turn on only a display area (in the case of an ultrasonic sensor, an oscillation unit) corresponding to ⓐ' area in the first blank period 1431 of the data enable signal VDEN, and it may acquire the biometric information using the biometric sensor located in ⓐ area. Further, the electronic device may turn on only the display area (in the case of the ultrasonic sensor, the oscillation unit) corresponding to ⓑ' area in the second blank period 1433 of the data enable signal VDEN, and it may acquire the biometric information using the biometric sensor located in ⓑ area. Further, the electronic device may turn on only the display area (in the case of the ultrasonic sensor, the oscillation unit) corresponding to ⓒ' area in the third blank period 1435 of the data enable signal VDEN, and it may acquire the biometric information using the biometric sensor located in ⓒ area. The above-described method may also be applied in the case where the biometric sensor is of a capacitive type in addition to the case where the biometric sensor is of the ultrasonic type.

A method for operating an electronic device 101 to reduce interference between a biometric sensor 240I and a display 160 may include extending a blank period of a reference signal that is any one of a plurality of signals for driving the display 160 in a state where the electronic device 101 senses user's biometric information; and sensing the user's biometric information through driving of the biometric sensor 240I in the extended blank period of the reference signal. The method may further include setting the blank period of the reference signal to a first time in a state where the user's biometric information is not sensed; and changing the blank period of the reference signal to a second time that is longer than the first time in the state where the user's biometric information is sensed. The method may further include changing the extended blank period of the reference signal to the first time if the sensed user's biometric information matches pre-stored biometric information. The method may further include calculating a refresh rate based on the extended reference signal and determining that the flicker can occur if the calculated refresh rate is smaller than a pre-stored threshold value. The plurality of signals for driving the display 160 may include a horizontal synchronization signal, a vertical synchronization signal, a data enable signal, and at least one clock pulse.

Figure 17:
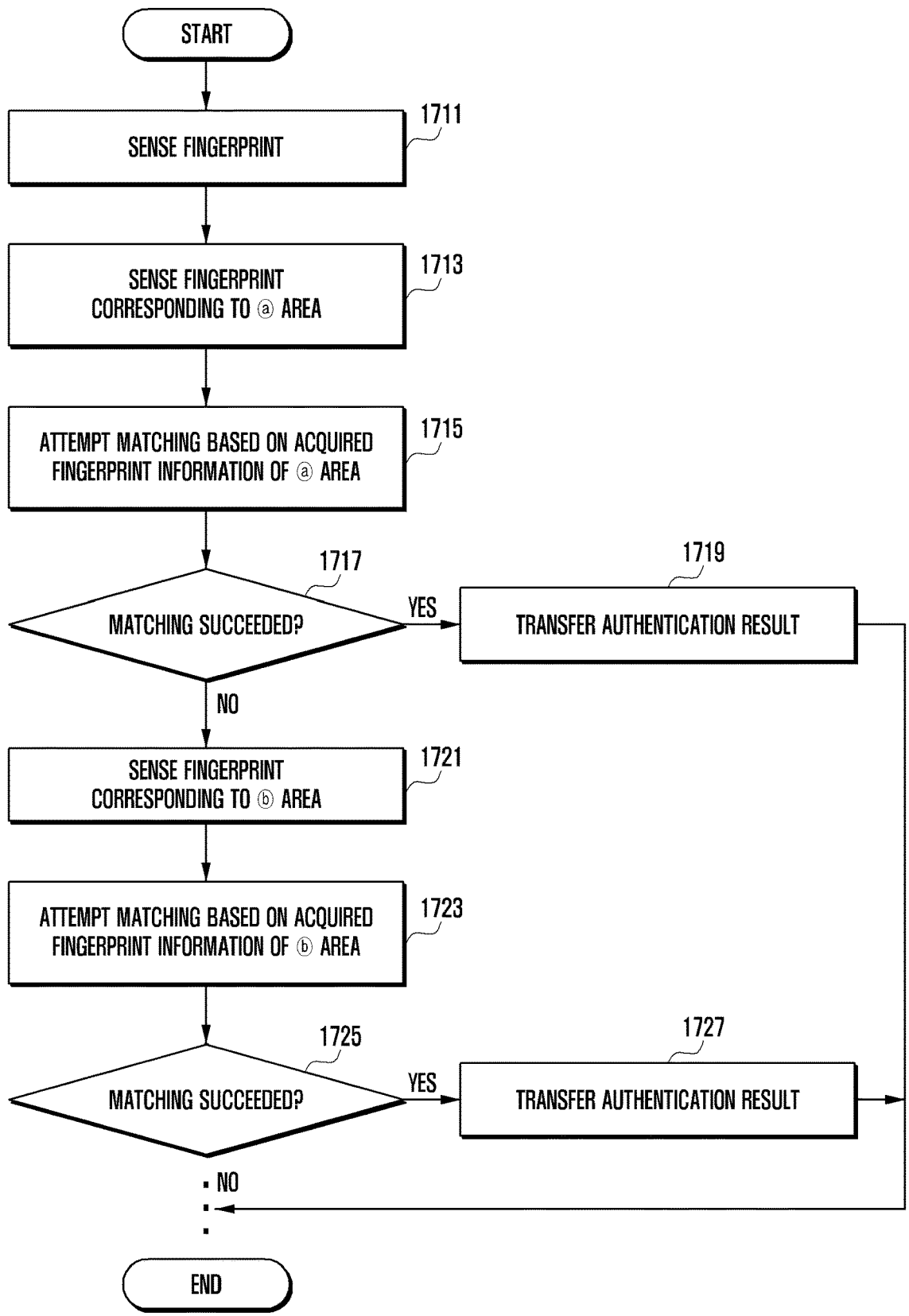
FIG. 17 is a flowchart of an operation of an electronic device according to various embodiments of the disclosure.

FIG. 17 is a flowchart of an operation of an electronic device according to various embodiments of the disclosure. Hereinafter, with reference to FIGS. 14 to 17, a method in which an electronic device according to various embodiments of the disclosure acquires biometric information will be described.

At operation 1711, for example, the electronic device 101 (e.g., processor 410) may provide a user interface for requesting a user authentication through a display during execution of a specific application, or if a user input through a specific key is sensed in a locked state or in a sleep state, the electronic device 101 may provide a user interface for requesting the user authentication through the display. For example, the electronic device 101 may determine the period in which at least one user interface as mentioned above is provided as a state where user's fingerprint input is sensed through a biometric sensor.

At operation 1713, for example, a sensor driver 420 or a DDI 430 of the electronic device 101 may partially acquire user's biometric information based on any one defined as a reference signal among a plurality of signals for driving the display. For example, the sensor driver 420 or the DDI 430 may use a data enable signal VDEN as the reference signal. For example, the sensor driver 420 or the DDI 430 may acquire a part of the user's biometric information by driving the biometric sensor (e.g., fingerprint sensor) located in a first sub-area 1521 during a first blank period 1431 between successive data enable signals VDEN. For example, the sensor driver 420 or the DDI 430 may sense the fingerprint information input to ⓐ area corresponding to the first sensor area 1521 of the biometric sensor 1520 during the first blank period 1431.

At operations 1713 and 1715, for example, the sensor driver 420 or the DDI 430 of the electronic device 101 may compare a part of the user's biometric information acquired in the first blank period 1431 with pre-stored biometric information during an output period 1441 of the data enable signal VDEN after the first blank period 1431 to identify whether the acquired user's biometric information and the pre-stored biometric information match each other. According to an embodiment, if the part of the user's biometric information acquired through the first blank period 1431 matches the pre-stored biometric information, the electronic device 101 may perform operation 1719, whereas if the part of the user's biometric information acquired through the first blank period 1431 does not match the pre-stored biometric information, the electronic device 101 may perform operation 1721.

At operation 1719, for example, the sensor driver 420 or the DDI 430 of the electronic device 101 may transfer a signal for notifying that the authentication for the user's biometric information has succeeded to the processor 410. As described above, an authentication success signal transferred from the sensor driver 420 or the DDI 430 to the processor 410 may be a signal for waking up the processor 410 in the case where the processor 410 is in a sleep state or in a low power state. For example, the sensor driver 420 or the DDI 430 of the electronic device 101 may transfer the signal for notifying of the authentication success to the processor 410 and it may transfer user's authentication information or information on an authenticated user to the processor 410.

At operation 1721, the sensor driver 420 or the DDI 430 of the electronic device 101 may acquire the part of the user's biometric information by driving the biometric sensor (e.g., fingerprint sensor) located in the first sub-area 1523 during a second blank period 1433 between the successive data enable signals VDEN. For example, the sensor driver 420 or the DDI 430 may sense the fingerprint information input to ⓑ area corresponding to the first sensor area 1523 of the biometric sensor 1520 during the second blank period 1433.

At operations 1723 and 1725, for example, the sensor driver 420 or the DDI 430 of the electronic device 101 may compare the part of the user's biometric information acquired in the first and second blank periods 1431 and 1433 with the pre-stored biometric information during an output period 1443 of the data enable signal VDEN after the second blank period 1433 to identify whether the acquired user's biometric information and the pre-stored biometric information match each other. According to an embodiment, if the part of the user's biometric information acquired through the first and second blank periods 1431 and 1433 matches the pre-stored biometric information, the electronic device 101 may perform operation 1727, whereas if the part of the user's biometric information acquired through the first and second blank periods 1431 and 1433 does not match the pre-stored biometric information, the electronic device 101 may perform matching operation by acquiring even the fingerprint information input to ⓒ area corresponding to the third sensor area 1525.

According to another embodiment, the electronic device 101 can perform the matching operation (e.g., operation 1715 and operation 1723) after acquiring user's fingerprint information corresponding to a plurality of areas (e.g., after acquiring fingerprint information for ⓐ area and fingerprint information for ⓑ area). The electronic device 101 according to various embodiments may determine when to perform the matching operation for a plurality of sensing areas (e.g., ⓐ area to ⓒ area) based on situation information of the electronic device. For example, the electronic device 101 may determine whether to perform the matching operation after acquiring the user's fingerprint information corresponding to several areas among the plurality of sensing areas at least based on the information acquired through an input device 250 or a sensor module 240. According to an embodiment, the electronic device 101 may determine a time point to perform the matching operation based on at least one of user's finger size, sufficiency of the acquired fingerprint information (e.g., the number of feature points), surrounding brightness, or an attribute of an image being displayed on a screen.

At operation 1727, for example, the sensor driver 420 or the DDI 430 of the electronic device 101 may transfer a signal for notifying that the authentication for the user's biometric information has succeeded to the processor 410. As described above, an authentication success signal transferred from the sensor driver 420 or the DDI 430 to the processor 410 may be a signal for waking up the processor 410 in the case where the processor 410 is in a sleep state or in a low power state. For example, the sensor driver 420 or the DDI 430 of the electronic device 101 may transfer the signal for notifying of the authentication success to the processor 410 and it may transfer the user's authentication information or information on an authenticated user to the processor 410.

According to an embodiment, for example, the electronic device 101 may determine that the user authentication has failed if all the acquired user's biometric information and the pre-stored biometric information do not match each other, and it may output a message for notifying of the user authentication failure through the display.

Figure 18:
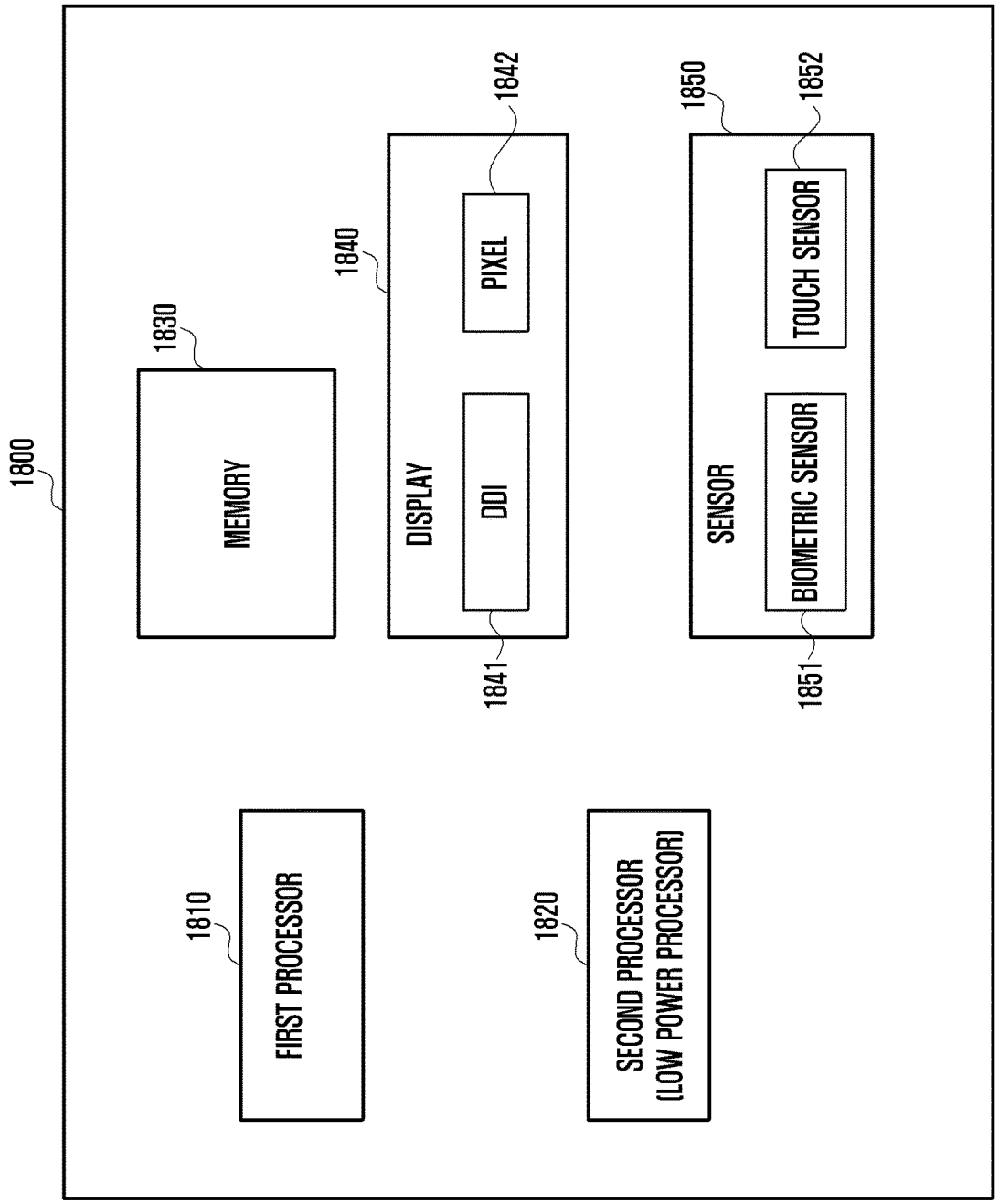
FIG. 18 is an exemplary diagram of an electronic device according to various embodiments of the disclosure.

FIG. 18 is an exemplary diagram of an electronic device according to various embodiments of the disclosure;

With reference to FIG. 18, an electronic device 1800 (e.g., electronic device 101) according to various embodiments may include at least one processor (e.g., first processor 1810 or a second processor 1820), a memory 1830 (e.g., memory 130), a display 1840 (e.g., display 1040), or at least one sensor 1850. The at least one processor 1810 or 1820 may be equal or similar to, for example, the processor 120.

The first processor 1810 (e.g., main processor) may control, for example, the overall driving of the electronic device 1800.

For example, if the electronic device 1800 is in a sleep state, the second processor 1820 (e.g., low power processor or sensor HUB) may process sensor information acquired through the at least one sensor 1850 or an input acquired from a user without making the first processor 1810 wake up. For example, the second processor 1820 may control the at least one sensor 1850 or the display 1840 independently of the first processor 1810.

The memory 1830 may include a general region for storing, for example, a user application or security-sensitive information, such as information for fingerprint sensing.

The display 1840 may include, for example, a display panel 1840 including a plurality of pixels and a display driver module (e.g., display driver IC (DDI) 1841) configured to provide display information by controlling at least parts of a plurality of pixels included in the display panel 1842.

The at least one sensor 1850 may include, for example, a biometric sensor 1851 (e.g., biometric sensor 240I) for sensing a user's fingerprint on the display 1840, or a touch sensor 1852 (e.g., touch panel 252) for sensing a user's touch on the display 1840. According to various embodiments, the at least one sensor 1850 may be an optical type fingerprint sensor, and it may be equal or similar to the sensor module 240. According to an embodiment, the biometric sensor 1851 may include an optical fingerprint sensor (e.g., image sensor) using light output from the display 1840 as a light source and an ultrasonic fingerprint sensor. According to another embodiment, the biometric sensor 1851 may be f fingerprint sensor driven in the capacitive type.

According to various embodiments, the at least one sensor 1850 may drive the plurality of pixels included in the display panel 1842 through the display driving module 1841 in response to the user input. According to an embodiment, the at least one sensor 1850 may control the display panel 1842 in order to acquire the user input or user's biometric information. For example, in order to acquire the user's biometric information, the biometric sensor 1851 may control the display panel 1842 to use the light emitted from the display panel 1842.

Figure 19:
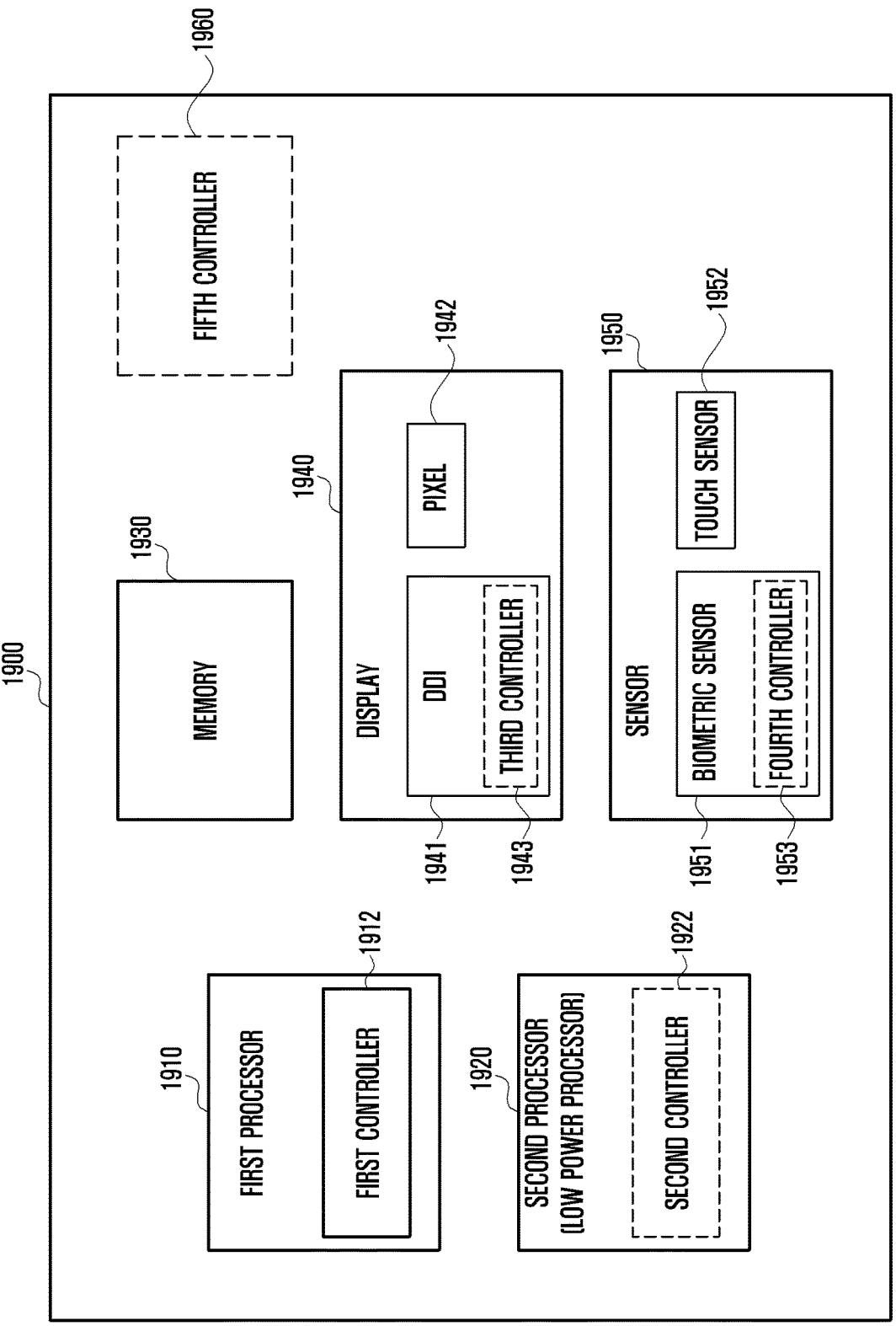
FIG. 19 is another exemplary diagram of an electronic device according to various embodiments of the disclosure.

FIG. 19 is another exemplary diagram of an electronic device according to various embodiments of the disclosure.

With reference to FIG. 19, an electronic device 1900 (e.g., electronic device 101) may include at least one processor (e.g., first processor 1910 or a second processor 1920), a memory 1930 (e.g., memory 130), a display 1940 (e.g., display 1040), or at least one sensor 1950. The at least one processor 1910 or 1920 may be equal or similar to, for example, the processor 120. For example, the at least one sensor 1950 may include a biometric sensor 1951 (e.g., biometric sensor 240I) for sensing a user's fingerprint on the display 1940 or a touch sensor 1952 (e.g., touch panel 252) for sensing a user's touch on the display 1940.

According to an embodiment, the electronic device 1900 (e.g., electronic device 101) may include a plurality of controllers. The plurality of controllers may include, for example, a first controller 1912, a second controller 1922, a third controller 1943, a fourth controller 1953, or a fifth controller 1960. For example, each of the plurality of controllers may be included in modules constituting the electronic device 1900. For example, each of the plurality of controllers may be included in the first processor 1910, the second processor 1920, a DDI 1941 (e.g., display driving module 1841) or a biometric sensor 1951.

According to an embodiment, the electronic device 1900 may control the module using the controller included in the corresponding module. For example, the electronic device 1900 may control the first processor 1910 using the first controller 1912, and it may control the second processor 1920 using the second controller 1922. Further, the electronic device 1900 may control the DDI 1941 using the third controller 1943, and it may control the biometric sensor 1951 using the fourth controller 1953.

According to an embodiment, the electronic device 1900 may control all modules included in the electronic device 1900 by designating one controller as a main controller and controlling the remaining controllers through the designated main controller. For example, the electronic device may control the remaining controllers using the main controller. For example, the electronic device 1900 may control the first controller 1912, the second controller 1922, the third controller 1943, or the fourth controller 1953 using the fifth controller 1960. The fifth controller 1960 may be a main controller included in any one of the modules constituting the electronic device 1900.

According to an embodiment, the electronic device 1900 may designate the main controller, and it may control other controllers through the designated main controller. For example, the electronic device 1900 may change the main controller from the fifth controller 1960 to the first controller 1912, and it may control the second to fifth controllers 1922, 1943, 1953, and 1960 that are the remaining controllers using the changed first controller 1912.

According to an embodiment, the electronic device 1900 may directly control the modules of the electronic device 1900 using one controller. For example, the electronic device 1900 may directly control the second processor 1920, the memory 1930, the display 1940, and/or the at least one sensor 1950 using the first controller 1912 included in the first processor 1910. According to another embodiment, the electronic device 1900 may directly control the display 1940 and the at least one sensor 1950 using one controller. For example, in the case where the biometric sensor 1951 is an optical fingerprint sensor using the display 1940 as a light source, the electronic device 1900 can easily acquire the user's fingerprint information by controlling the display 1940 and the biometric sensor 1951 using one controller.

Figure 20:
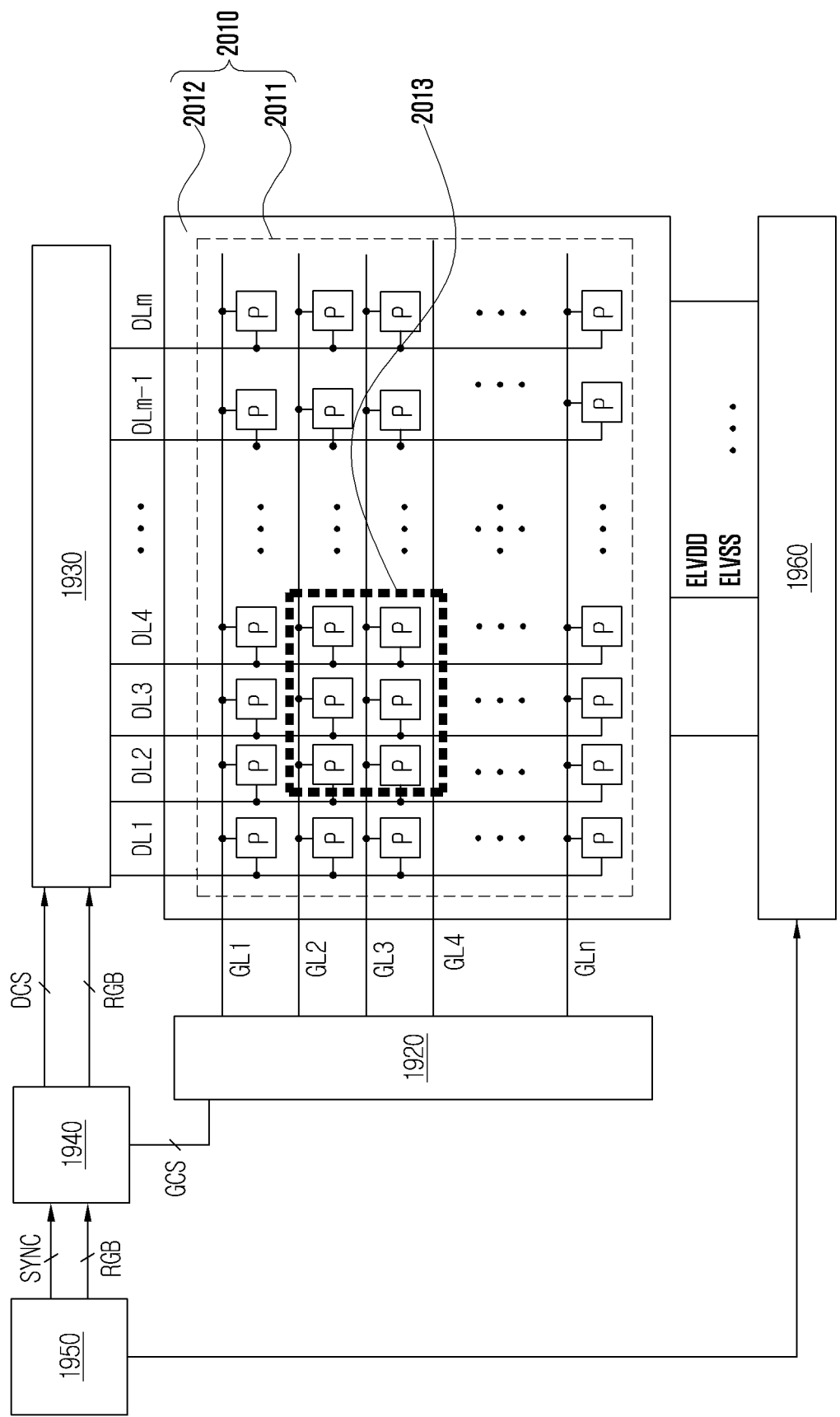
FIG. 20 is a configuration diagram illustrating a display and a display driver according to various embodiments.

FIG. 20 is a configuration diagram illustrating a display and a display driver according to various embodiments.

With reference to FIG. 20, a display 2010 (e.g., display 160) may include, for example, a display area (screen area) 2011 and a non-display area 2012. For example, the display 2010 may include a plurality of gate lines GL1 to GLn and a plurality of data lines DL1 to DLm crossing each other. For example, a pixel P may be formed in an area where the gate lines GL and the data line DL cross each other. Each pixel P may include, for example, an organic light emitting diode (OLED) and a pixel driving circuit for driving the OLED. The display driver (e.g., DDI 1741) for driving the display 2010 may include, for example, a gate driver 2020, a data driver 2030, a timing controller 2040, and an interface block 2040. According to an embodiment, the display area 2011 may include a first area 2013 in which a fingerprint sensor is disclosed, and the first area 2013 may be controlled separately from (independently of) other areas.

For example, the pixel driving circuit provided in each pixel P may include at least one thin film transistor, at least one capacitor, and an organic light emitting diode (OLED). For example, at least one thin film transistor may charge the capacitor with a data voltage being supplied from the data line DL in response to a scan signal being supplied from the gate line GL. For example, the at least one thin film transistor may control the amount of current being supplied to the organic light emitting diode in accordance with the data voltage charged in the capacitor.

For example, the gate driver 2020 may supply a scan signal to the plurality of gate lines GL1 to GLn in accordance with at least one gate control signal GCS provided from the timing controller 2040. For example, the gate driver 2020 may include a gate shift register outputting a scan signal or a scan pulse. For example, the scan signal is successively supplied to the respective pixels, and it may be composed of a single or a plurality of signals. For example, if the scan signal is composed of a plurality of signals, the gate line GL may be composed of a plurality of lines for supplying the plurality of scan signals to the respective pixels.

The data driver 2030 may convert video data RGB provided from the timing controller 2040 into a data voltage in accordance with at least one data control signal DCS provided from the timing controller 2040. For example, the data driver 2030 may generate a data voltage using a plurality of gamma compensation voltages. For example, the data driver 2030 may successively supply the generated data voltage to the plurality of pixels in the unit of a line, for example, in the unit of a row. For example, the data driver 2030 may include a data shift register outputting a sampling signal, a latch circuit latching the video data in the unit of a row in response to the sampling signal, and a digital-to-analog converter converting the latched video data into an analog gray scale voltage (pixel voltage).

The timing controller 2040 may align the video data RGB provided from an interface block 2050 to suit the size and resolution of the display 2010. For example, the timing controller 2040 may supply the aligned video data RGB to the data driver 2030. For example, the timing controller 2040 may transmit a plurality of control signals GCS and DCS using at least one synchronization signal SYNC provided from the interface block 2050. For example, the plurality of control signals GCS and DCS may include at least one gate control signal GCS and at least one data control signal DCS. For example, the data control signal DCS may be a signal for controlling the driving timing of the data driver 2030. For example, the synchronization signals SYNC may include a dot clock (DCLK), a data enable signal DE, a horizontal synchronization signal H-Sync, or a vertical synchronization signal V-Sync. According to an embodiment, the interface block 2050 may receive the video data RGB from the processor (e.g., processor 830), for example, the application processor, and it may transmit the received video data RGB to the timing controller 2040. For example, the interface block 2050 may generate and transmit at least one synchronization signal SYNC to the timing controller 2040. For example, the interface block 2050 may control a power supply unit 2060 (e.g., power supply unit 860) to supply at least one driving voltage ELVDD or ELVSS to the display 2010.

According to an embodiment, the power supply unit 2060 may generate at least one driving voltage ELVDD or ELVSS required to drive the display 2010, and it may supply the generated driving voltage ELVDD or ELVSS to the display 2010. According to an embodiment, a single or a plurality of power supply units 2060 may be provided to independently supply the at least one driving voltage ELVDD or ELVSS with respect to a first area 2013 in which the fingerprint sensor is disposed and an area excluding the first area 2013 (e.g., second area). For example, the at least one driving voltage may include, for example, ELVDD, ELVSS, gate-on voltage, gate-off voltage, or initialization voltage. For example, the gate-on voltage may be a voltage for turning on at least one thin film transistor provided in the display. For example, the gate-off voltage may be a voltage for turning off the at least one thin film transistor provided in the display. For example, the initialization voltage may be a voltage for initializing at least one node provided in the pixel driving circuit.

Figure 21:
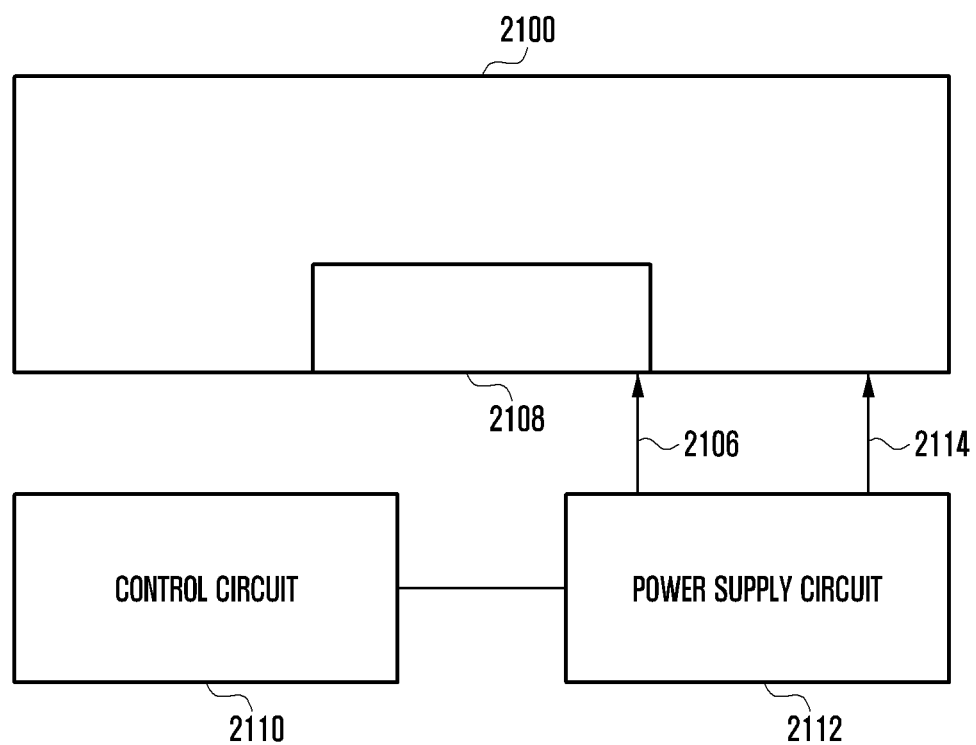
FIG. 21 is an exemplary diagram of a display panel from which a light-emitting power unit of a panel area corresponding to a fingerprint sensor is separated.

FIG. 21 is an exemplary diagram of a display panel from which a light-emitting power unit of a panel area corresponding to a fingerprint sensor is separated.

With reference to FIG. 21, if an optical fingerprint sensor does not use the light generated from a display panel 2100, but uses a separate light source (e.g., IR LED), a transistor controlling a pixel may react on the corresponding light source, and thus it may not be easy to adjust luminance. Accordingly, during the operation of the fingerprint sensor, the power of only the display of the corresponding area may be temporarily turned off. According to an embodiment, a power supply circuit 2112 may be provided with a power interconnection 2106 connected to a display area 2108 in which a fingerprint sensor is located separately from a power interconnect 2114 being supplied to the whole display panel 2100, and it may control the power of the display area on which the fingerprint sensor is mounted. For example, the control circuit 2110 may adjust an ELVSS voltage of a partial area corresponding to the panel area 2108 corresponding to the fingerprint sensor to an ELVDD voltage or the like. According to an embodiment of the disclosure, the control circuit 2110 may set the power for the display area 2108 in which the fingerprint sensor is located to an off state. The control circuit 2110 (e.g., DDI 1741) may include an algorithm to minimize an influence on a picture quality due to the light source of the fingerprint sensor in the display area 2108 in which the fingerprint sensor is located within a range in which the performance of the fingerprint sensor is not changed. According to an embodiment, if the user's touch input is sensed or if the user input approaches, the electronic device may sense the area corresponding to the user input or the input, and it may turn off the power of the corresponding portion. According to an embodiment of the disclosure, a luminance difference may occur due to an occurrence of a resistance difference during separated designing of the circuit, and this portion can be compensated for by the control circuit (e.g., DDI 1741). Further, a compensation algorithm in consideration of the hysteresis characteristics that may occur by temporarily blocking the power supply to the corresponding portion may be included in the controller (e.g., DDI 1741).

According to various embodiments, a flicker phenomenon may occur in the information being displayed on a corresponding area during the operation of the biometric sensor, and only the pixels in the area corresponding to the biometric sensor may be turned off at least temporarily. According to various embodiments, the display of the electronic device may be configured to separately control a VDEN signal line being supplied to the area corresponding to the biometric sensor, and thus the VDEN signal may not be temporarily supplied during the biometric recognition period.

As described above, according to various embodiments of the disclosure, because the mutual interference between the display and the biometric sensor can be reduced and the sufficient time for processing the data of the biometric sensor can be secured, the recognition accuracy of the biometric sensor can be heightened.

Each of the above-described elements of hardware according to the disclosure may include one or more components, and the names of the elements may vary based on the type of electronic device. In various embodiments, the electronic device may include at least one of the above-described elements, and may exclude some of the elements or further include other additional elements. Further, some of the elements of the electronic device according to the various embodiments may be combined to form a single entity, and thus, may equivalently execute functions of the corresponding elements prior to the combination.

The invention claimed is:

1. An electronic device comprising:
a display;
a biometric sensor formed on at least a part of the display; and
a processor functionally connected to the display and the biometric sensor,
wherein the processor is configured to:
extend a blank period of a reference signal that is any one of a plurality of signals for driving the display in a state where user's biometric information is sensed,
sense the user's biometric information through driving of the biometric sensor in the extended blank period of the reference signal,
determine whether a flicker occurs based on the extended blank period, and
display a predetermined background image to reduce the flicker occurrence when it is determined that the flicker occurs.

2. The electronic device of claim 1, wherein the processor is configured to: set the blank period of the reference signal to a first time in a state where the user's biometric information is not sensed, and change the blank period of the reference signal to a second time that is longer than the first time in the state where the user's biometric information is sensed.

3. The electronic device of claim 2, wherein the processor is configured to change the extended blank period of the reference signal to the first time if the sensed user's biometric information matches pre-stored biometric information.

4. The electronic device of claim 1, wherein the processor is configured to: calculate a refresh rate based on the extended blank period of the reference signal in order to determine whether the flicker occurs, and determine that the flicker can occur if the calculated refresh rate is smaller than a pre-stored threshold value.

5. The electronic device of claim 1, wherein the predetermined background image comprises a user interface including the flicker or an image having a brightness adjusted to be equal to or lower than a specific brightness.

6. The electronic device of claim 1, wherein the plurality of signals for driving the display comprises a horizontal synchronization signal, a vertical synchronization signal, a data enable signal, and at least one clock pulse.

7. The electronic device of claim 1, wherein the biometric sensor is defined to be divided into a plurality of sensor areas, and the processor is configured to: successively drive the biometric sensor in a unit of the respective sensor areas during blank periods of the successive reference signals, and acquire the user's biometric information partially and successively during the blank periods.

8. The electronic device of claim 7, wherein the processor is configured to: sense a first portion of the user's biometric information during a first blank period of the reference signal, perform a matching operation between the first portion and pre-stored biometric information while the reference signal is output after the first blank period, sense a second portion of the user's biometric information during a second blank period of the reference signal, perform a matching operation between the second portion and the pre-stored biometric information while the reference signal is output after the second blank period, sense a third portion of the user's biometric information during a third blank period of the reference signal, and perform a matching operation between the third portion and the pre-stored biometric information while the reference signal is output after the third blank period.

9. The electronic device of claim 8, wherein the processor is configured to bypass the operations of sensing and matching the user's biometric information if the result of the matching between any one of the sensed first to third portions of the user's biometric information and the pre-stored biometric information has succeeded.

10. A method for operating an electronic device to reduce interference between a biometric sensor and a display, comprising:

extending a blank period of a reference signal that is any one of a plurality of signals for driving the display in a state where the electronic device senses user's biometric information;

sensing the user's biometric information through driving of the biometric sensor in the extended blank period of the reference signal, determining whether a flicker occurs based on the extended blank period; and displaying a predetermined background image to reduce the flicker occurrence when it is determined that the flicker occurs.

11. The method of claim 10, further comprising:

setting the blank period of the reference signal to a first time in a state where the user's biometric information is not sensed; and changing the blank period of the reference signal to a second time that is longer than the first time in the state where the user's biometric information is sensed.

12. The method of claim 11, further comprising changing the extended blank period of the reference signal to the first time if the sensed user's biometric information matches pre-stored biometric information.

13. The method of claim 10, wherein determining whether the flicker occurs comprises:

calculating a refresh rate based on the extended blank period of the reference signal; and determining that the flicker can occur if the calculated refresh rate is smaller than a pre-stored threshold value.

* * * * *